US012709421B1

(12) United States Patent
Alzyod et al.

(10) Patent No.: US 12,709,421 B1
(45) Date of Patent: Aug. 18, 2026

(54) CBR-BASED ENERGY MANAGEMENT FRAMEWORK FOR HYBRID UAVs BASED ON STATE EXTRACTION

(71) Applicant: KING FAHD UNIVERSITY OF PETROLEUM AND MINERALS, Dhahran (SA)

(72) Inventors: Mohammad Nayel Alzyod, Dhahran (SA); Ali Taleb Al-Awami, Dhahran (SA); Haitham Hassan Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/391,718

(22) Filed: Nov. 17, 2025

(51) Int. Cl.
*B64U 50/32* (2023.01)
*G05B 13/02* (2006.01)

(52) U.S. Cl.
CPC ......... *B64U 50/32* (2023.01); *G05B 13/0275* (2013.01)

(58) Field of Classification Search
CPC ............................ B64U 50/32; G05B 13/0275
USPC .............................................................. 701/3
See application file for complete search history.

(56) References Cited

U.S. PATENT DOCUMENTS

2016/0297544 A1* 10/2016 Kim .......................... H02J 7/34
2022/0239129 A1* 7/2022 Winkler .................. B60L 15/20
2023/0163331 A1* 5/2023 Han .................. H01M 8/04626 123/306
2024/0391596 A1 11/2024 Knapp et al.

FOREIGN PATENT DOCUMENTS

CN 114919752 A 8/2022
CN 116238695 A 6/2023
CN 118783607 A * 10/2024 .............. B60L 50/70
CN 119088064 A * 12/2024 ............... G05D 1/46
CN 119116786 A * 12/2024 ............. G06N 3/006
(Continued)

OTHER PUBLICATIONS

Oksuztepe, Energy Management System for Fuel Cell/Supercapacitor Hybrid Powered Unmanned Aerial Vehicle with Switched Reluctance Motor, Dec. 16, 2021, SSRN (Year: 2021).*
(Continued)

*Primary Examiner* — Matthias S Weisfeld
(74) *Attorney, Agent, or Firm* — Oblon, McClelland, Maier & Neustadt, L.L.P.

(57) ABSTRACT

An apparatus for managing energy in an unmanned aerial vehicle (UAV) including a hybrid powertrain that is configured to provide electric power to onboard power-consuming units coupled to a DC bus and includes a fuel cell coupled through a boost converter, a battery coupled through a bidirectional converter, and a supercapacitor directly coupled to the DC bus. The apparatus includes processing circuitry configured to optimize weighting factors of an equivalent consumption minimization (ECM) model for multiple load profile scenarios, extract a state variable dataset including state variables and fuel cell power reference values, and generate a representative dataset through data reduction. Based on real-time state measurements, the processing circuitry identifies historical cases from the representative dataset and allocates power among the fuel cell, battery, and supercapacitor.

20 Claims, 17 Drawing Sheets

(56) References Cited

FOREIGN PATENT DOCUMENTS

| | | | | | |
|---|---|---|---|---|---|
| CN | 120016555 | A | * | 5/2025 | ............. G06N 20/00 |
| WO | WO-2017001411 | A1 | * | 1/2017 | ........ H01M 8/04014 |

OTHER PUBLICATIONS

Çinar, Active Energy Management Based on Meta-Heuristic Algorithms of Fuel Cell/Battery/Supercapacitor Energy Storage System for Aircraft, Mar. 18, 2021, Aerospace (Year: 2021).*

Andrew Gong, et al., "Analysis of a fuel-cell/battery/supercapacitor hybrid propulsion system for a UAV using a hardware-in-the-loop flight simulator", 2018 AIAA/IEEE Electric Aircraft Technologies Symposium (EATS), Cincinnati, OH, USA, 2018, pp. 1-17.

* cited by examiner

200

CBR-BASED ENERGY MANAGEMENT FRAMEWORK FOR HYBRID UAVs BASED ON STATE EXTRACTION

STATEMENT REGARDING PRIOR DISCLOSURE BY THE INVENTORS

Aspects of this technology are described in an article by Mohammad N. Alzyod, Ali T. Al-Awami, and Haitham H. Saleh, titled "A CBR-Based Energy Management Framework for Hybrid UAVs Based on State Extraction," published on IEEE Transactions on Transportation Electrification. The publication is herein incorporated by reference in its entirety.

STATEMENT OF ACKNOWLEDGEMENT

Support provided by King Fahd University of Petroleum & Minerals (KFUPM), Dhahran, Saudi Arabia, is gratefully acknowledged.

BACKGROUND

Technical Field

The present disclosure is directed to energy management in unmanned aerial vehicles (UAVs), and more particularly, to a case-based reasoning (CBR)-based energy management framework for hybrid UAVs based on state extraction.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Unmanned aerial vehicles (UAVs) have become increasingly important in both military and civilian applications, including agriculture, surveillance, environmental monitoring, and logistics. With the global UAV market rapidly expanding, there is a growing demand for long-endurance drones that may operate efficiently under variable flight conditions. Conventional UAVs powered by batteries, often supplemented by supercapacitors (SCs), suffer from low energy density, which restricts flight duration. Although fuel cells offer a high-energy-density alternative, their slow dynamic response makes them unsuitable for handling rapid power fluctuations typically encountered during takeoff, maneuvering, or payload variations.

In a hybrid UAV, the energy management system (EMS) plays a crucial role in determining how power is shared among the fuel cell, the battery, and the supercapacitors. The EMS may ensure efficient power distribution while maintaining system stability, extending fuel cell life, and preserving battery health. However, designing an effective EMS for UAVs presents unique challenges. Unlike ground-based or stationary systems, UAVs are severely constrained by size, weight, and power availability.

Existing EMS techniques may be broadly classified into rule-based (RB), optimization-based (OB), and learning-based (LB) methods. Rule-based (RB) strategies, such as fuzzy logic controllers and heuristic decision-making models, require minimal computational resources but rely on pre-defined heuristics, resulting in limited adaptability to dynamic flight conditions. Optimization-based (OB) approaches, such as model predictive control and equivalent consumption minimization (ECM), provide improved adaptability and may minimize hydrogen consumption, but the computational complexity of real-time optimization increases hardware requirements and energy consumption. Additionally, learning-based (LB) methods, including reinforcement learning and Q-learning, improve adaptability but still demand extensive computational power and large training datasets, making them unsuitable for small UAV platforms with strict weight and power constraints.

The trade-off between adaptability and computational efficiency continues to hinder the advancement of EMS solutions for UAVs. Rule-based methods lack flexibility, while optimization and learning-based methods impose excessive computational demands, making them unsuitable for resource-constrained flight environments. Furthermore, most existing approaches are optimized for a single load profile and cannot generalize across a wide range of mission scenarios involving different payloads, flight speeds, and environmental conditions. This limitation affects both energy efficiency and component longevity, leading to reduced endurance, increased hydrogen consumption, and accelerated degradation of the fuel cell stack.

Accordingly, it is one object of the present disclosure to provide a method and apparatus for real-time energy management in hybrid UAVs that achieve high adaptability, computational efficiency, and operational endurance across dynamically varying flight conditions.

SUMMARY

In an exemplary embodiment, a method for managing energy in an unmanned aerial vehicle (UAV) is described. The UAV includes a hybrid powertrain configured to provide electric power to onboard power-consuming units coupled to a DC bus. The hybrid powertrain includes a fuel cell coupled to the DC bus through a boost converter, a battery coupled to the DC bus through a bidirectional converter, and a supercapacitor directly coupled to the DC bus. The method includes, for each of a plurality of load profile scenarios, optimizing a weighting factor of an equivalent consumption minimization (ECM) model. The method further includes extracting a state variable dataset based on the plurality of load profile scenarios and the optimized weighting factors, each entry of the state variable dataset corresponding to a time instance and including a plurality of state variables and an associated fuel cell power reference value. The method further includes generating a representative dataset of cases by applying data reduction to the state variable dataset. The method further includes performing real-time energy management of the hybrid powertrain by identifying, based on real-time state measurements of the UAV, a plurality of historical cases from the representative dataset and allocating power among the fuel cell, the battery, and the supercapacitor based on the identified plurality of historical cases.

In an exemplary embodiment, an apparatus for managing energy in an unmanned aerial vehicle (UAV) is described. The UAV includes a hybrid powertrain configured to provide electric power to onboard power-consuming units coupled to a DC bus. The hybrid powertrain includes a fuel cell coupled to the DC bus through a boost converter, a battery coupled to the DC bus through a bidirectional converter, and a supercapacitor directly coupled to the DC bus. The apparatus includes processing circuitry configured to, for each of a plurality of load profile scenarios, optimize a weighting factor of an equivalent consumption minimization (ECM)

model. The processing circuitry is further configured to extract a state variable dataset based on the plurality of load profile scenarios and the optimized weighting factors, each entry of the state variable dataset corresponding to a time instance and including a plurality of state variables and an associated fuel cell power reference value. The processing circuitry is further configured to generate a representative dataset of cases by applying data reduction to the state variable dataset. The processing circuitry is further configured to perform real-time energy management of the hybrid powertrain by identifying, based on real-time state measurements of the UAV, a plurality of historical cases from the representative dataset and allocating power among the fuel cell, the battery, and the supercapacitor based on the identified plurality of historical cases.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
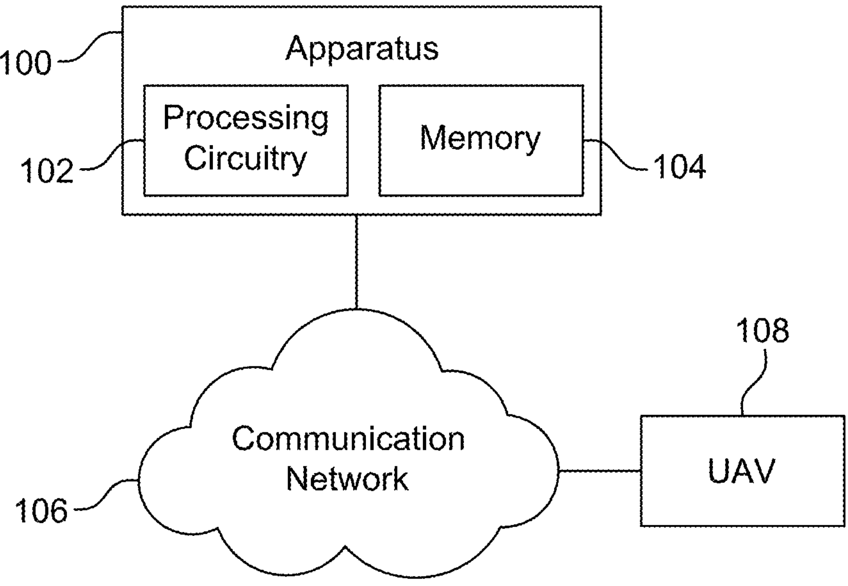
FIG. 1 is an environment of an apparatus for managing energy in an unmanned aerial vehicle (UAV), according to certain embodiments.

In the drawings, like reference numerals designate identical or corresponding parts throughout the several views. Further, as used herein, the words "a", "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Unmanned aerial vehicles (UAVs), commonly referred to as drones, have become increasingly prevalent across both military and civilian applications. By the current year, non-military UAV sales are projected to reach approximately 11 billion dollars. UAVs have demonstrated indispensable utility across multiple industrial sectors, including agriculture, meteorological observation, firefighting, and military reconnaissance. Modern UAVs predominantly operate using battery-based power systems, occasionally supplemented by supercapacitors (SCs). However, prolonged flight endurance remains limited due to the low energy density of batteries.

Fuel cells (FCs) offer a high-energy-density alternative but are hindered by slow response times, rendering them unsuitable for standalone operation in highly dynamic UAV environments. This has led to the emergence of hybrid FC/battery/SC UAV architectures designed to balance high energy density with fast response characteristics. In prior art, several techniques have been disclosed to enhance the performance of fuel-cell-based UAVs, including optimization of fuel tank weight, thermal management analysis, improvements in energy-efficient structural design, integration of embedded hydrogen generators, and development of energy management systems (EMS).

Among these, the EMS plays a critical role by efficiently allocating power among hybrid energy sources, thereby improving performance metrics such as endurance, fuel economy, and overall operational efficiency. The EMS may respond adaptively to the UAV's dynamic load variations, which are influenced by continuously changing mission requirements. These dynamic load profiles represent fluctuating power consumption patterns that the UAV must manage in real time. Consequently, an adaptive EMS capable of redistributing power among the FC, battery, and SC in real time becomes essential.

However, adaptability often introduces increased computational demand, which leads to added hardware weight, cost, and power consumption, ultimately impacting UAV endurance. While stationary EMS implementations or those used in hybrid electric vehicles may accommodate greater computational overhead due to fewer space and weight constraints, UAV systems require stringent optimization of hardware resources. Computational efficiency therefore becomes a critical design factor in UAV EMS architectures, as additional computation directly affects flight performance and operational duration.

Existing EMS are generally categorized into three groups: rule-based (RB), optimization-based (OB), and learning-based (LB). Table I summarizes the characteristics of different EMS categories.

TABLE I

Characteristics of different EMS categories

| EMS Category | Addressing Adaptability | Computational Efficiency | Sample Reference |
|---|---|---|---|
| RB | low | high | 1 |
| OB | high | low | 2 |
| LB | low | high | 3 |
| ORB | medium | high | 4 |
| LB based on OB | high | high | Present disclosure |

Sample Reference 1: Y. Shen, P. Cui, X. Wang, X. Han, and Y.-X. Wang, "Variable structure battery-based fuel cell hybrid power system and its incremental fuzzy logic energy management strategy," International Journal of Hydrogen Energy, vol. 45, no. 21, pp. 12130-12142, 2020.

Sample Reference 2: M. N. Boukoberine, M. F. Zia, M. Benbouzid, Z. Zhou, and T. Donateo, "Hybrid fuel cell powered drones energy management strategy improvement and hydrogen saving using real flight test data," Energy Conversion and Management, vol. 236, p. 113987, 2021.

Sample Reference 3: Q. Gao, T. Lei, F. Deng, Z. Min, W. Yao, and X. Zhang, "A deep reinforcement learning based energy management strategy for fuel-cell electric uav," in 2022 International Conference on Power Energy Systems and Applications (ICoPESA). IEEE, 2022, pp. 524-530.

Sample Reference 4: M. N. Boukoberine, T. Donateo, and M. Benbouzid, "Optimized energy management strategy for hybrid fuel cell powered drones in persistent missions using real flight test data," IEEE Transactions on Energy Conversion, vol. 37, no. 3, pp. 2080-2091, 2022.

RB EMSs are simple and require minimal computation, as described in sample reference 1 and 2. Rule-based EMS techniques are straightforward and computationally lightweight, making them suitable for real-time applications with limited onboard resources. For instance, fuzzy logic-based controllers employ membership functions to determine optimal FC power allocation based on state of charge (SOC) and load demand, with decision-making guided by a state machine. Despite their simplicity, RB methods rely heavily on predefined rules and experiential parameters, which may not ensure optimal control performance under dynamic and unpredictable flight conditions.

To overcome these limitations, optimized rule-based (ORB) methods have been introduced (as described in sample reference 4) that combine traditional rule-based logic with multi-objective optimization techniques. Such methods enhance UAV endurance and performance by optimizing key parameters such as FC power limits and battery SOC thresholds to minimize hydrogen consumption. However, these methods are typically optimized for a single load profile, limiting their adaptability to new and varying mission conditions.

Optimization-based (OB) EMS techniques use global or real-time optimization frameworks. Global optimization, executed offline before flight missions, can yield optimal control trajectories but is impractical for real-time use due to the unavailability of the complete mission load profile. Real-time OB methods, such as model predictive control (MPC) and equivalent consumption minimization (ECM), offer improved adaptability for dynamic loads. For example, MPC-based methods enhance the durability of FC hybrid UAVs by optimizing FC operation trajectories, whereas ECM-based approaches minimize hydrogen consumption by accounting for both direct FC usage and indirect energy storage consumption. However, OB methods require computationally intensive in-flight calculations, resulting in greater system complexity and power consumption, which negatively affect UAV performance.

Learning-based (LB) EMS methods have emerged as a promising alternative due to their reduced computational complexity and potential for real-time adaptability. Nonetheless, very limited work in existing technologies has been directed toward applying LB methods to UAV EMS. For example, hierarchical EMS frameworks that integrate state machine rules with reinforcement learning algorithms have been used to stabilize SOC and balance power distribution, but such approaches are generally restricted to cruising UAVs with stable load conditions. Similarly, deep reinforcement learning (DRL) techniques have been used to address multi-objective optimization in UAV hybrid power systems, but these still impose high computational requirements unsuitable for real-time deployment in highly dynamic flight environments.

Accordingly, there exists a need for methods and systems that provide solutions to the above-mentioned problems by enabling a computationally efficient and adaptive energy management system (EMS) for hybrid UAVs integrating fuel cells, batteries, and supercapacitors.

The present disclosure fulfils this need by providing a multi-stage framework for real-time hybrid UAV energy management utilizing a case-based reasoning (CBR) method. The disclosed framework employs a learning-based (LB) methodology that requires minimal computational resources, making it suitable for real-time deployment in UAVs with limited onboard processing capacity.

The disclosed framework ensures CBR adaptability by generating a comprehensive dataset of state variables under optimal operating conditions across multiple load scenarios. The dataset is extracted using an enhanced Equivalent Consumption Minimization (ECM) method in an offline stage, covering a wide range of operating profiles to capture optimal power allocation behavior. A reduced subset of this extracted dataset forms the CBR repository, which serves as the knowledge base for real-time energy management decisions.

During UAV operation, the CBR references this pre-computed repository to determine the optimal power distribution among the FC, battery, and SC subsystems, eliminating the need for computationally intensive online optimization or iterative learning. The framework thereby achieves fast, context-aware energy allocation decisions with high efficiency and low latency.

The disclosed framework combines the high adaptability of learning-based approaches with the low computational burden of rule-based systems, providing a balanced solution for UAV hybrid power management. Extensive simulations demonstrate that the proposed system achieves superior adaptability and computational efficiency when benchmarked against conventional EMS techniques. The present disclosure thus provides a practical and scalable energy management solution for hybrid UAVs, enabling improved endurance, operational safety, and mission efficiency without compromising real-time performance.

FIG. 1 is an environment of an apparatus 100 for managing energy in an unmanned aerial vehicle (UAV). In certain embodiments, examples of the UAV 108 may include, but are not limited to, a rotary-wing drone, a fixed-wing drone, a hybrid vertical take-off and landing (VTOL) drone, or any other aerial vehicle employing multiple power sources for propulsion and control operations. The apparatus 100 may be implemented as an onboard or remotely located computing system that facilitates real-time energy management of a hybrid powertrain included in the UAV 108.

The apparatus 100 includes processing circuitry 102 and a memory 104. The processing circuitry 102 may be implemented as one or more microprocessors, microcomputers, microcontrollers, Digital Signal Processors (DSPs), Central Processing Units (CPUs), logic circuitries, and/or any devices that process data based on operational instructions. The memory 104 may be a volatile memory, such as a Random-Access Memory (RAM), or a non-volatile memory such as a Read Only Memory (ROM), an Erasable Programmable Read Only Memory (EPROM), a flash memory, and the like.

The processing circuitry 102 and the memory 104 are operatively coupled to one another and are configured to execute instructions for performing one or more operations described herein. The processing circuitry 102 may include one or more processing units, such as a microprocessor, microcontroller, or any suitable programmable logic device, capable of executing instructions stored in the memory 104. The memory 104 stores executable instructions and datasets required for implementing energy management operations, including the optimization of weighting factors of an equivalent consumption minimization (ECM) model, extraction of a state variable dataset, generation of a representative dataset of cases, and real-time energy management of the hybrid powertrain of the UAV 108.

In certain embodiments, the apparatus 100 may communicate with the UAV 108 through a communication network 106. The communication network 106 may include one or more wired or wireless communication interfaces, including cellular, satellite, or short-range communication links, that enable the transfer of data between the apparatus 100 and the UAV 108. Examples of the communication network 106 may include, but are not limited to, a Wide Area Network (WAN), a Local Area Network (LAN), a wireless network, a mobile network, a Virtual Private Network (VPN), an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof. The communication network 106 facilitates the transmission of real-time state measurements, load profile data, or control signals used in energy management operations.

The UAV 108 includes a hybrid powertrain configured to provide electric power to onboard power-consuming units coupled to a DC bus. The hybrid powertrain includes a fuel cell coupled to the DC bus through a boost converter, a battery coupled to the DC bus through a bidirectional converter, and a supercapacitor directly coupled to the DC bus. Each component of the hybrid powertrain will be explained in greater detail in conjunction with FIG. 2.

In order to manage energy in the UAV, the processing circuitry 102 is configured to, for each of a plurality of load profile scenarios, optimize a weighting factor of the equivalent consumption minimization (ECM) model. In certain embodiments, the processing circuitry 102 is configured to generate the plurality of load profile scenarios by acquiring a load profile from an experiment conducted with respect to the UAV 108, adjusting the acquired load profile to obtain a scaled load profile, and applying payload modulation (PLM), fast-dynamics modulation (FDM), and slow-dynamics modulation (SDM) to the scaled load profile to synthesize the plurality of load profile scenarios. Each of the plurality of load profile scenarios is synthesized to simulate a corresponding degree of load fluctuations of the onboard power-consuming units.

In certain embodiments, the ECM model includes a first penalty function responsive to a state-of-charge (SOC) deviation of the battery and a second penalty function responsive to a power deviation of the fuel cell. The processing circuitry 102 optimizes, for each of the plurality of load profile scenarios, a first weighting factor corresponding to a first penalty function responsive to a state-of-charge (SOC) deviation of the battery and a second weighting factor corresponding to a second penalty function responsive to a power deviation of the fuel cell, so as to minimize an equivalent power consumption of the UAV 108. The processing circuitry 102, for each of the plurality of load profile scenarios, may identify a pair of optimized first and second weighting factors based on a non-dominated sorting genetic algorithm, so as to achieve minimized hydrogen consumption and minimized SOC deviation.

The processing circuitry 102 is further configured to extract a state variable dataset based on the plurality of load profile scenarios and the optimized weighting factors. Each entry of the state variable dataset corresponds to a time instance and includes a plurality of state variables and an associated fuel cell power reference value. In certain embodiments, the plurality of state variables includes a state-of-charge (SOC) deviation of the battery, a filtered load power, a deviation between a load power and the filtered load power, a deviation between a fuel cell power and the filtered load power, and a deviation between a battery power and a reference charging power.

The processing circuitry 102 is further configured to generate a representative dataset of cases by applying data reduction to the state variable dataset. In certain embodiments, the processing circuitry 102 is further configured to perform data reduction by executing a k-means clustering algorithm to partition the state variable dataset into a number of clusters, so as to identify the representative dataset having a size substantially smaller than the size of the state variable dataset.

The processing circuitry 102 is further configured to perform real-time energy management of the hybrid powertrain by identifying, based on real-time state measurements of the UAV 108, a plurality of historical cases from a representative dataset and allocating power among the fuel cell, the battery, and the supercapacitor based on the identified plurality of historical cases.

In certain embodiments, the processing circuitry 102 identifies the plurality of historical cases based on a similarity metric representing a degree of similarity between each case in the representative dataset and a current case represented by the real-time state measurements of the UAV 108. The similarity metric may be a weighted Euclidean distance calculated across the plurality of state variables. A k-nearest neighbors algorithm may be applied to select a plurality of historical cases having smallest weighted Euclidean distances as the identified plurality of historical cases. The weights used in the weighted Euclidean distance represent relative importances of each of the plurality of state variables. The processing circuitry 102 then applies a weighted average estimation based on weights determined based on inverse of distances between the current case and each of the identified plurality of historical cases to generate a real-time power reference value of the fuel cell.

Figure 2:
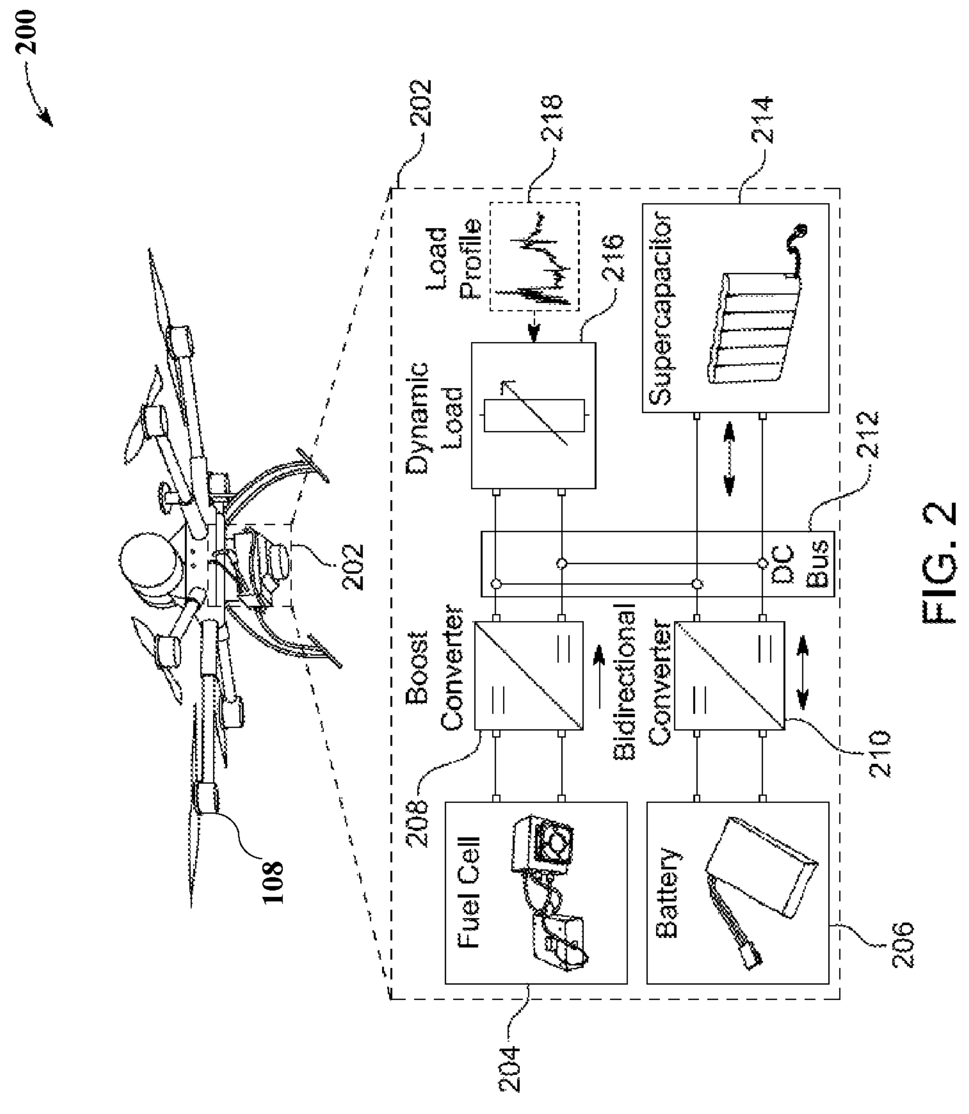
FIG. 2 illustrates an exemplary schematic diagram of a hybrid powertrain of the UAV 108, according to certain embodiments.

FIG. 2 illustrates an exemplary schematic diagram 200 of a hybrid powertrain of the UAV 108, according to certain embodiments.

As shown in FIG. 2, the UAV 108 includes a hybrid powertrain 202 (also referred to as a hybrid drone powertrain) configured to provide electric power to onboard power-consuming units. The onboard power-consuming units refer to the electrical loads within the UAV 108 that require power for operation during flight. The onboard power-consuming units include, but are not limited to, propulsion motors, flight control electronics, communication and sensing modules, payload systems, and supporting auxiliary circuits.

The hybrid powertrain 202 includes power sources, power converters, motors, and an energy management system (EMS) microcontroller (not shown), for example. The hybrid powertrain 202 integrates multiple energy sources, including a fuel cell 204, a battery 206, and a supercapacitor 214, interconnected through respective power converters and coupled to a common DC bus 212. The onboard power-consuming units are coupled to the DC bus 212 of the hybrid powertrain 202 and receive regulated electric power from the fuel cell 204, the battery 206, and the supercapacitor 214 through their respective converters.

To meet the power requirements for various flight tasks and to extend endurance, the hybrid powertrain 202 integrates three complementary energy sources, a proton exchange membrane fuel cell (PEM FC) 204, a lithium-ion (Li-ion) battery 206, and a supercapacitor (SC) 214. Each energy source compensates for the operational limitations of the others. The fuel cell 204 serves as the main power source and efficiently provides steady-state power during flight. The battery 206 acts as an auxiliary source, supplying additional energy required during high-demand or extended flight conditions. The supercapacitor 214 supports the system during rapid and transient power fluctuations, ensuring stable operation of the UAV 108.

A DC-DC boost converter 208 with current-mode control is coupled between the fuel cell 204 and the DC bus 212. The boost converter 208 stabilizes the output voltage of the fuel cell 204 and manages the voltage difference between the fuel cell and the DC bus 212, ensuring consistent power delivery to the onboard units. The output power of the fuel cell 204 is determined by the EMS microcontroller based on real-time power requirements and supplied to the DC bus 212 through the boost converter 208.

The battery 206, functioning as an energy buffer, can be used to supplement the fuel cell 204 during transient or peak load conditions. Direct connection of the battery 206 to the DC bus 212 may lead to risks of overcharging or overdischarging, especially during rapid load changes, potentially shortening battery life. To mitigate this, the hybrid powertrain 202 employs a bidirectional DC-DC converter 210 with voltage-mode control. The bidirectional converter 210 ensures proper regulation of the DC bus voltage and enables controlled charging and discharging of the battery 206 by managing current flow bidirectionally between the battery 206 and the DC bus 212.

The supercapacitor 214 is directly connected to the DC bus 212 without an intermediate converter. The supercapacitor 214 smooths high-frequency power fluctuations and provides rapid charge and discharge capability during instantaneous load changes. This reduces stress on the battery 206 and extends its operational lifetime by mitigating large current surges. The hybrid powertrain topology of the UAV 108, ensures efficient and stable power flow among the fuel cell 204, battery 206, and supercapacitor 214 while maintaining a constant DC bus voltage for the UAV's 108 onboard electronics and propulsion system.

In certain embodiments, for modeling and simulation of the hybrid powertrain 202, electric circuit-based models integrated into Simulink's Simscape Power Systems (SPS) toolbox are utilized. Such modeling facilitates flexible parameter adjustments based on component datasheets. The DC-DC converters 208 and 210 are represented using average value models, which employ controlled voltage and current sources in place of switching elements. This modeling approach maintains the conversion dynamics of the power converters while significantly reducing overall simulation time.

The hybrid powertrain 202 further includes a dynamic load 216 representing the power demand of the UAV's 108 propulsion motors and other electronic subsystems. The load profile 218 defines the variation of power demand over time and is modeled as a dynamic load by adjusting a variable resistor connected to the DC bus 212. The energy management system (EMS) determines the optimal fuel cell output power supplied through the boost converter 208, while the bidirectional converter 210 and the supercapacitor 214 together handle transient and fluctuating power demands. The supercapacitor 214 minimizes DC bus voltage deviations during sudden changes in the load profile 218, ensuring continuous and efficient operation of the UAV 108.

Accordingly, the hybrid powertrain 202 provides a balanced and efficient energy-sharing mechanism among the fuel cell 204, the battery 206, and the supercapacitor 214, thereby ensuring stable flight operation, extended endurance, and improved system reliability of the UAV 108 under diverse load conditions.

Figure 3A:
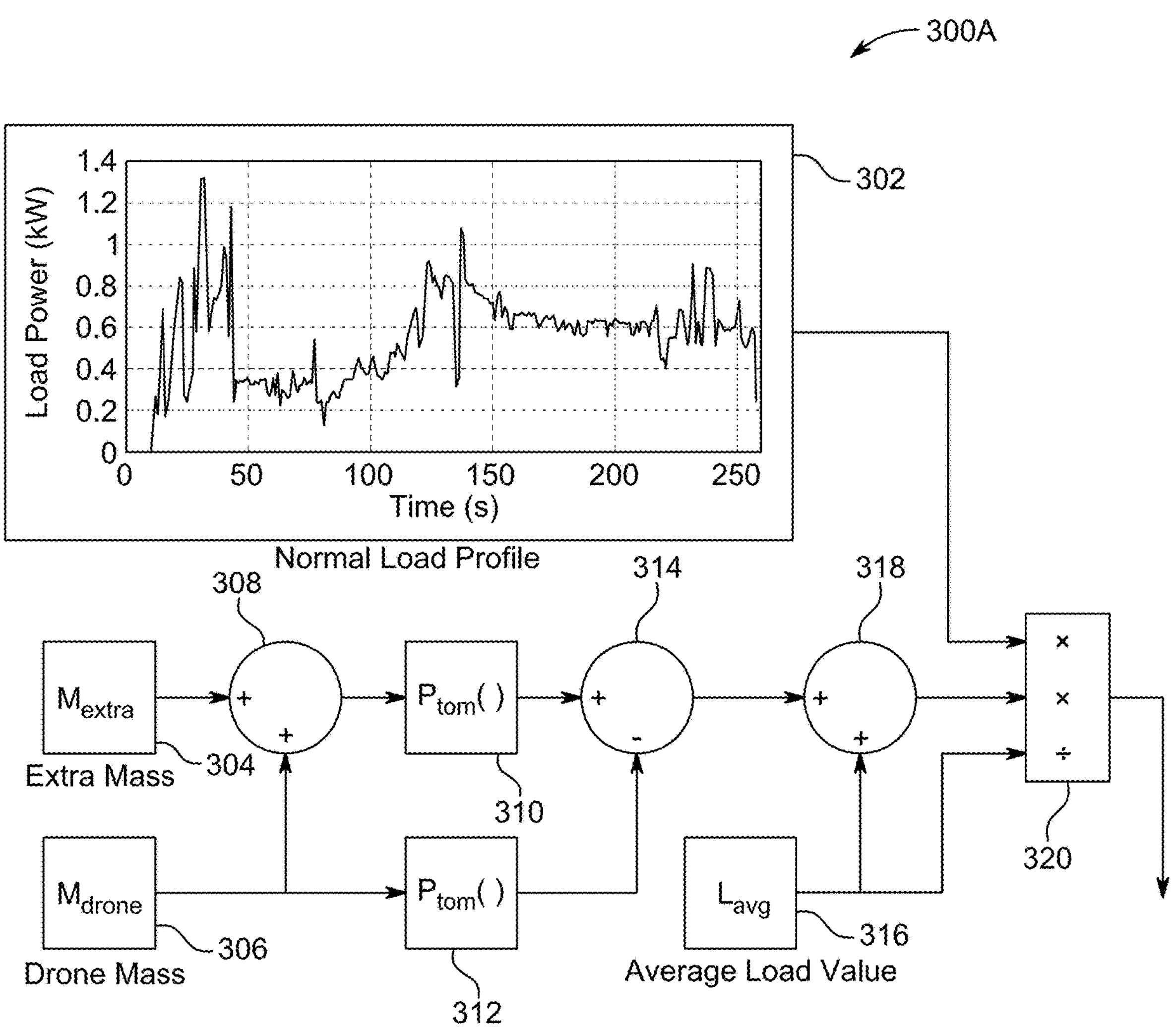
FIG. 3A illustrates a schematic diagram of a payload modulation (PLM) method for the synthesis of a drone load profile, according to certain embodiments.
Figure 3B:
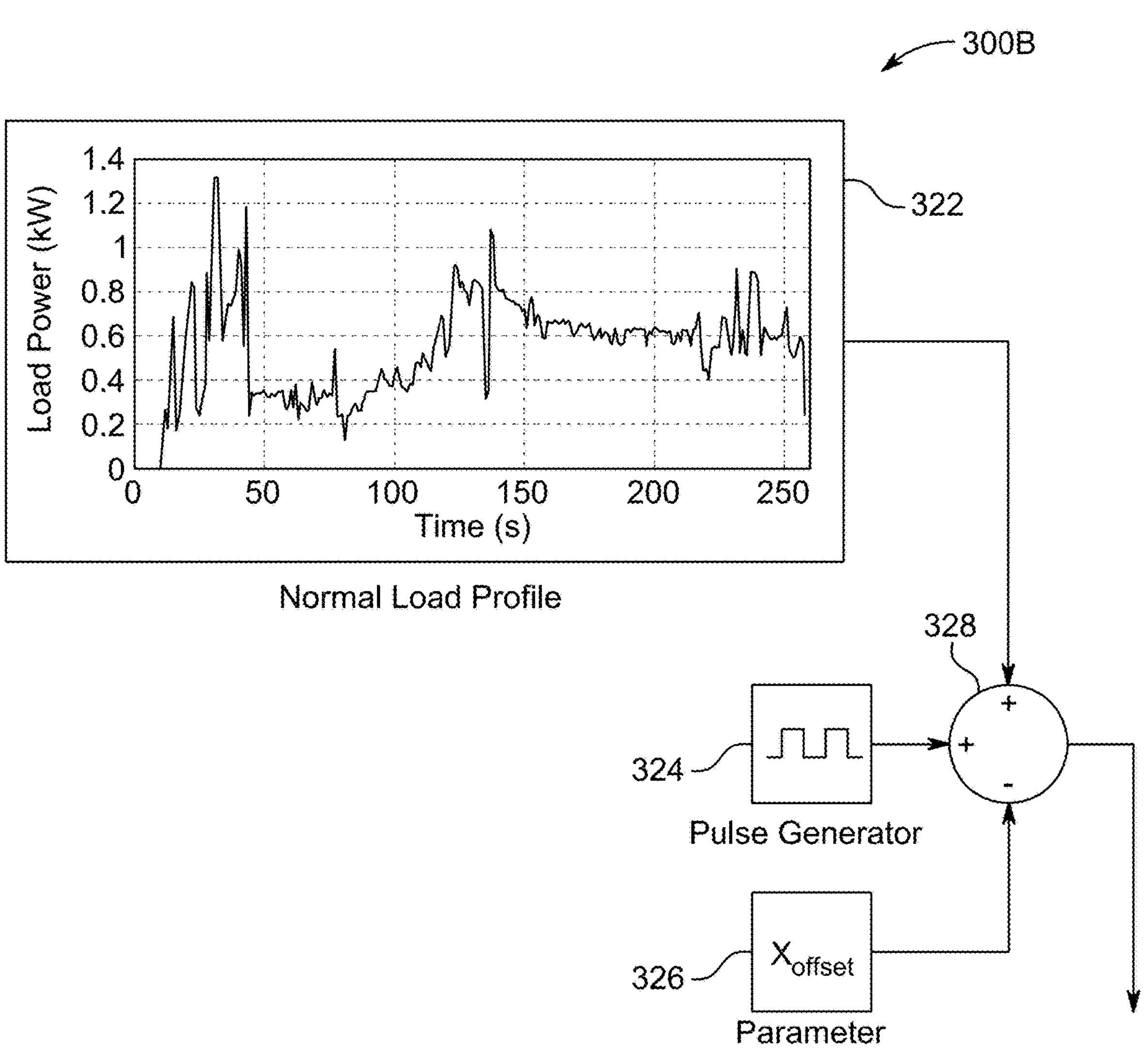
FIG. 3B illustrates a schematic diagram of a fast-dynamics modulation (FDM) method for the synthesis of a drone load profile, according to certain embodiments.
Figure 3C:
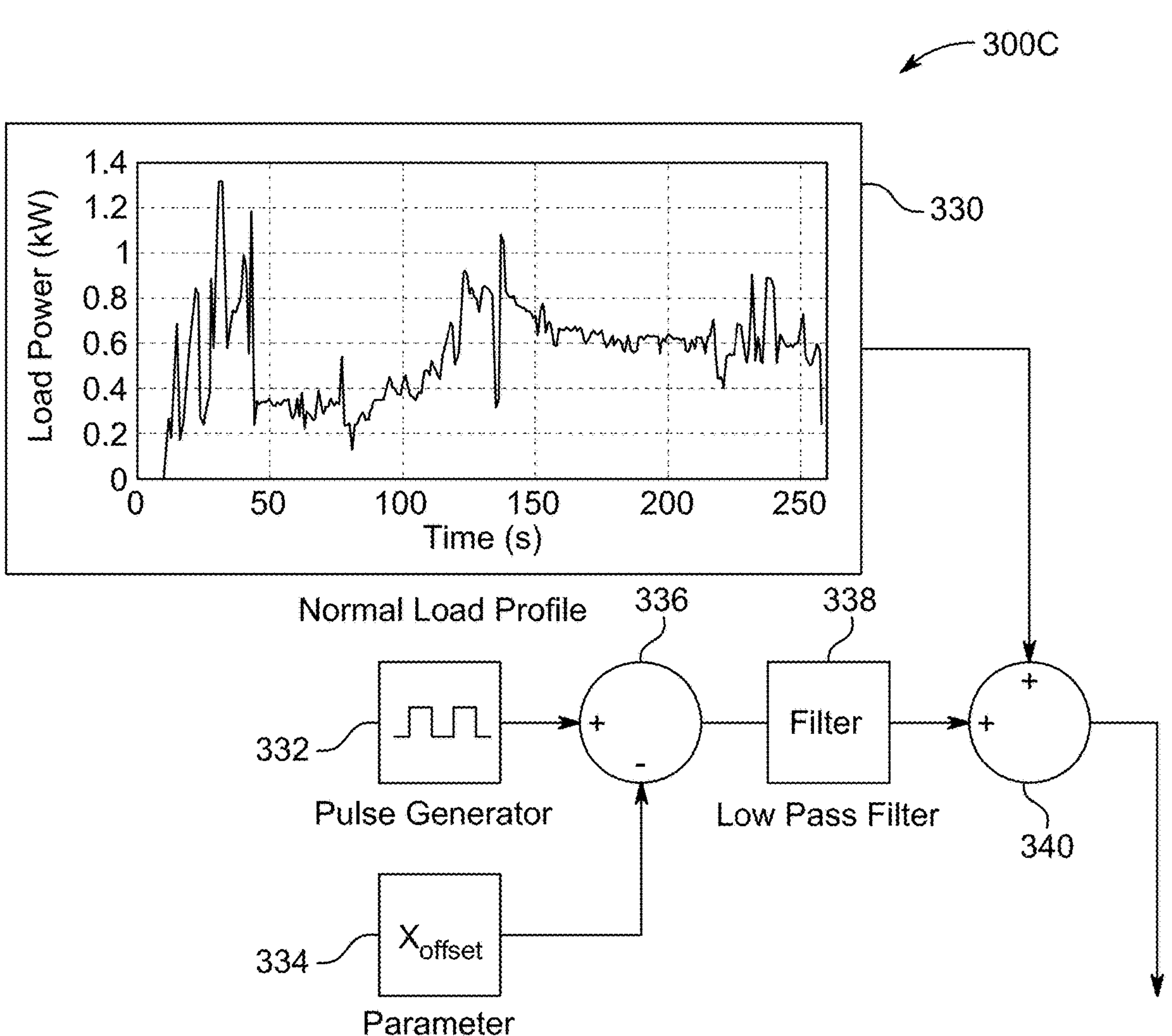
FIG. 3C illustrates a schematic diagram of the slow-dynamics modulation (SDM) method for the synthesis of a drone load profile, according to certain embodiments.

FIGS. 3A-3C illustrate schematic diagrams 300A-300C representing three different methods for synthesizing drone load profile scenarios, according to certain embodiments. Energy management system (EMS) behavior may be significantly impacted by the unique characteristics of load profiles. Hence, to ensure the adaptability of the energy management system (EMS) in real-world environments, it is essential to have a diverse set of load profiles for training and testing. However, a comprehensive drone load profile dataset is not readily available in the existing prior art. Therefore, the present disclosure provides three methods for synthesizing load profile scenarios, each designed to simulate varying degrees of dynamic load fluctuations. These methods include a payload modulation (PLM), a fast-dynamics modulation (FDM), and a slow-dynamics modulation (SDM). These three methods are based on a scaled version of a load profile obtained from experimental work. The scaling is performed according to the drone's weight to ensure that the reference load profile accurately reflects the vehicle's characteristics. The scaled profile serves as a reference, or normal load profile, to be used in the synthesis process for generating new load profile scenarios, as illustrated in FIGS. 3A-3C.

FIG. 3A illustrates a schematic diagram 300A of the payload modulation (PLM) method for the synthesis of a drone load profile. The PLM method simulates how the drone power consumption, $P_{tom}$, is affected by the payload mass, $m_{tom}$.

As shown in FIG. 3A, a normal load profile 302 provides a reference profile representing the scaled baseline power consumption of the UAV. An extra mass block 304 represents the variable payload applied to the drone, and a drone mass block 306 represents the baseline weight of the drone without payload. The extra mass 304 and drone mass 306 are combined at a summing node 308 to generate the total mass $m_{tom}$, which is provided to a power computation block 310 denoted $P_{tom}$( ) The power computation block 310 computes the power consumption corresponding to the total mass using the relationship:

$$P_{tom}(m_{tom}) = \kappa_{int}\frac{(m_{tom}\cdot g)^2}{2\sqrt{2\cdot\rho_{air}\cdot A_{prop}}} \quad (1)$$

where $\kappa_{int}$ is the inefficiency factor for the specific propeller configuration, g represents gravitational acceleration, $\rho_{air}$ denotes air density, and $A_{prop}$ represents the propeller disc area. By keeping other parameters constant, the payload is varied to reflect the effect of additional mass on the drone's power requirement. The baseline drone power is similarly computed at a block 312. An average load value block 316 produces $L_{avg}$, which is used at a summing node 314 to compute the deviation of the instantaneous power from the average. The resulting deviation is then combined at a node 318 and processed through a scaling block 320 to yield the synthesized PLM-based load profile. For each payload mass value, a new load profile scenario is thus generated, allowing the EMS to evaluate how power demand changes with payload variations.

FIG. 3B illustrates a schematic diagram 300B of the fast-dynamics modulation (FDM) method for the synthesis of a drone load profile. In this method, FDM introduces extreme load variations by employing a pulse generator 324 to create offsets above and below the normal load profile. A normal load profile 322 provides the baseline input signal, while the pulse generator 324 produces a periodic pulse waveform that simulates abrupt changes in load. A parameter block 326 defines an offset value $x_o ff_{set}$, which determines the amplitude of the generated pulses. Both signals are applied to an adder 328 that superimposes the pulse waveform on the normal load profile 322. The pulse generator 324 produces only positive pulses; therefore, the peak-to-peak value of the resulting waveform is set to twice the offset value to produce symmetric positive and negative load variations. Different offset values may be selected to represent varying levels of dynamic fluctuation. The intention of this method is to replicate severe and abrupt load changes that can occur in dynamic environments, thereby providing extreme load scenarios for testing EMS adaptability.

FIG. 3C illustrates a schematic diagram 300C of the slow-dynamics modulation (SDM) method for the synthesis of a drone load profile. SDM builds upon the FDM method by introducing a low-pass filter to create slower load profile variations. In this configuration, a normal load profile 330 serves as the baseline reference. A pulse generator 332, controlled by a parameter block 334 defining an offset value, generates a pulse waveform similar to that in the FDM approach. The pulse waveform and baseline load profile are combined at an adder 336 to form an intermediate modulated signal. The output of the adder 336 is passed through a low-pass filter 338, which smooths out high-frequency transitions and generates gradual load changes. The filtered output is then provided to a summing unit 340, producing the final SDM-based load profile. The SDM method ensures that energy management is tested not only in extreme scenarios but also in cases where load changes are more predictable and gradual, thereby offering a more comprehensive evaluation of the strategy's adaptability.

Figure 4:
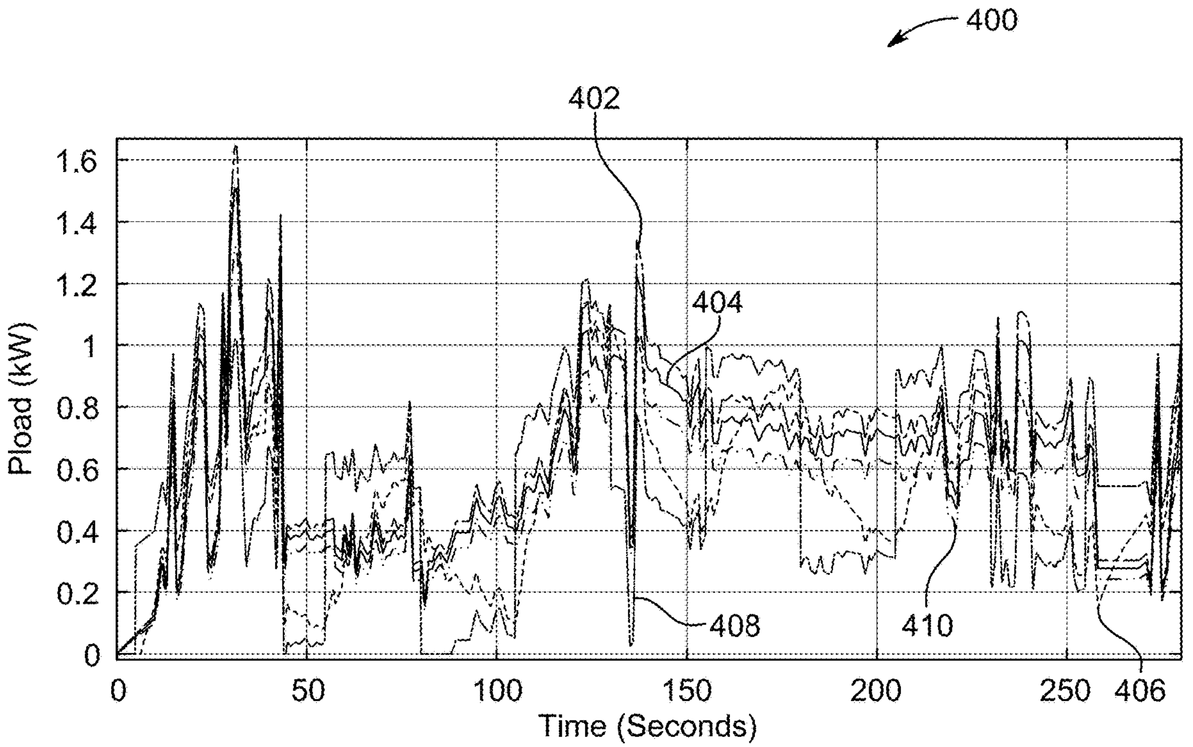
FIG. 4 is a plot representing load profile scenarios for each of the PLM, FDM, and SDM methods, according to certain embodiments.

Therefore, the PLM, FDM, and SDM methods collectively provide a diverse and representative set of synthesized load profile scenarios, enabling the UAV's energy management system to be trained and validated under a wide range of dynamic and steady-state conditions. FIG. 4 is a plot 400 representing load profile scenarios for each of the PLM, FDM, and SDM methods, according to certain embodiments. The horizontal axis represents time in seconds, while the vertical axis represents the corresponding power demand (Pload) in kilowatts. The various plotted curves illustrate how the synthesized load profiles behave under different modulation conditions and payload values, thereby providing a diverse set of dynamic load conditions for energy management system (EMS) evaluation and optimization.

As shown, the curve 410 corresponds to the normal load profile, which serves as the baseline or reference scenario derived from experimental data scaled according to the UAV's total weight. The curve 408 represents an example of the fast-dynamics modulation (FDM) method, which produces rapid and abrupt load fluctuations with an offset of 300 watts, replicating severe dynamic variations in the power demand profile. The curve 406 represents an example of the slow-dynamics modulation (SDM) method, which produces slower and smoother variations in power with the same 300-watt offset, illustrating the gradual load transitions resulting from the low-pass filter applied in the SDM process. The curves 402 and 404 represent examples of the payload modulation (PLM) method, with payload masses of 1500 grams and 900 grams, respectively. These curves demonstrate how the overall power requirement of the UAV increases with additional payload mass, simulating the impact of different payload configurations on flight power demand.

In certain embodiments, as depicted in FIG. 4, a total of 40 load profile scenarios are generated for comprehensive EMS training and validation. Scenario 1 represents the normal load profile corresponding to curve 410. Scenarios 2 through 13 are generated using the FDM method, with offset amplitudes incremented from 25 watts to 300 watts in 25-watt steps. Scenarios 14 through 25 are generated using the SDM method, employing the same offset range and increments as the FDM method to simulate gradual but equivalent variations in load behavior. Scenarios 26 through 40 are generated using the PLM method by varying the additional payload mass from 100 grams to 1500 grams in 100-gram increments. This systematic approach to load profile synthesis enables the EMS to be trained and tested under a broad range of operating conditions, from mild to extreme, ensuring adaptability and robustness during real-world UAV operation.

In a benchmark of energy management strategies, the prior art describes three EMS methods, specifically ORB, FL, and ECM strategies, which are utilized as benchmarks in the present disclosure. Among these, the ECM strategy has particular attention due to its relevance in the subsequent methodology. ECM ensures an efficient operation of each source without requiring advanced predictions or prior knowledge about the planned mission. When the drone's battery is actively providing energy, its SOC gradually decreases. To compensate, the FC may step in and provide more power. Conversely, when the battery's SOC is high, the burden on the FC may be lower, ultimately reducing the consumption of hydrogen. In essence, the energy delivered by the battery is translated into an equivalent hydrogen consumption to streamline the optimization process into a single objective. This virtual hydrogen consumption of the battery is directly proportional to the energy it provides and is scaled by an equivalence factor. In its most basic form, ECM may be formulated as follows:

$$\text{Minimize} \tag{2}$$

$$F(t) = [P_{FC}(t) + \lambda(t) \cdot P_{Bat}(t)] \cdot \Delta T$$

$$\text{Subject to} \begin{cases} P_{FC}(t) + P_{Bat}(t) = P_{Load}(t) \\ P_{FC-min} \le P_{FC}(t) \le P_{FC-max} \\ P_{Bat-min} \le P_{Bat}(t) \le P_{Bat-max} \end{cases} \tag{3}$$

$$\lambda(t) = 1 - 2\beta\left[\frac{SOC(t) - 0.5(SOC_{max} + SOC_{min})}{SOC_{max} + SOC_{min}}\right] \tag{4}$$

where $P_{FC}(t)$ is the FC power, $P_{Bat}(t)$ is the battery power, $\lambda(t)$ is the equivalence factor, and $\beta$ is a constant (typically 0.6). Also, $P_{Bat-min}$, $P_{Bat-max}$, $P_{FC-min}$, $P_{FC-max}$, $S_{OCmin}$, and $SOC_{max}$ represent the lower and upper limits on battery power, FC power, and battery SOC, respectively.

Figure 5:
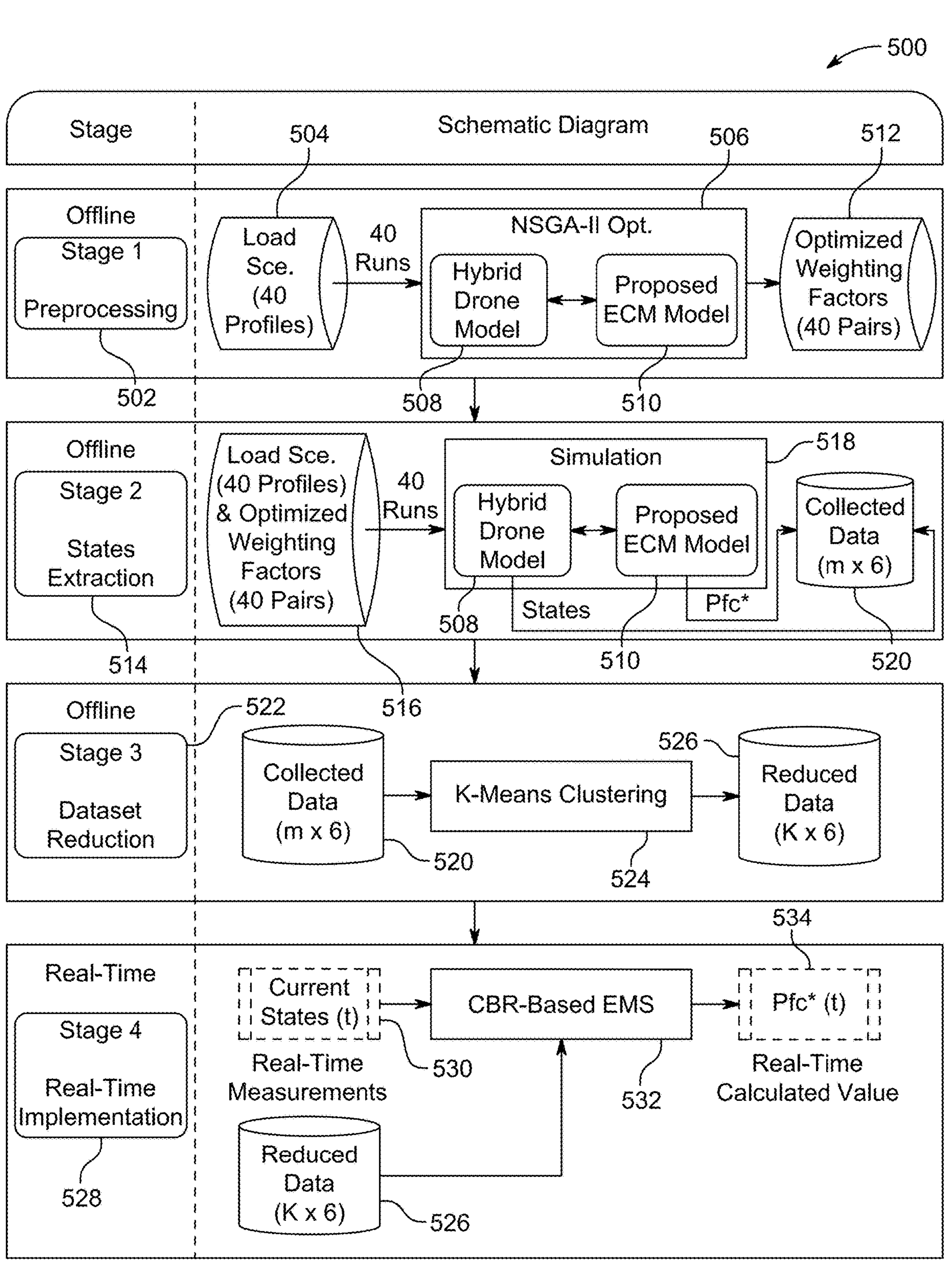
FIG. 5 illustrates a case-based reasoning (CBR)-based real-time energy management system (EMS) framework, according to certain embodiments.

FIG. 5 illustrates a case-based reasoning (CBR)-based real-time energy management system (EMS) framework 500. In certain embodiments, the disclosed EMS framework 500 is based on real-time implementation of CBR-based EMS with data extracted from an enhanced version of ECM. The framework 500 includes four consecutive stages. These includes Stage 1: preprocessing 502, stage 2: states extraction 514, stage 3: dataset reduction 522, and stage 4: real-time implementation 528. Stages 1 to 3 are executed in an offline environment, while stage 4 operates in real-time during UAV flight. In the first stage, an enhanced version of ECM is introduced and optimized for each of the synthesized load scenarios. Although not intended as the final EMS, the first stage generates the necessary data for CBR. In the second stage, the factors optimized in the first stage are used along with their corresponding load scenarios to gather extensive state variable data and optimized FC power reference points. The third stage clusters this data to create a representative dataset that retains the essential information. Finally, the fourth stage includes the real-time implementation of the CBR-based EMS that uses the reduced dataset obtained in stage 3.

In the first stage (e.g., Stage 1) of the proposed EMS framework 500, which corresponds to the preprocessing phase 502, the aim is to prepare the hybrid UAV system for model optimization. A set of load scenarios 504 (e.g., 40 profiles) is generated to simulate various power demand conditions. These load scenarios may be created by acquiring a reference load profile from UAV flight data, scaling it appropriately, and applying payload modulation (PLM), fast-dynamics modulation (FDM), and slow-dynamics modulation (SDM) to produce multiple variations representing realistic operational conditions.

The NSGA-II optimization module 506 (non-dominated sorting genetic algorithm) operates in conjunction with a hybrid drone model 508 and an equivalent consumption minimization (ECM) model 510. The ECM model 510 includes a first penalty function responsive to a state-of-charge (SOC) deviation of the battery and a second penalty function responsive to a power deviation of the fuel cell. The NSGA-II optimizer 506 executes multiple optimization runs (e.g., 40 runs) for each load profile to determine a pair of optimized weighting factors that minimize equivalent power consumption while balancing hydrogen consumption and SOC deviation. The resulting optimized weighting factors 512 (40 pairs) are then stored for use in subsequent stages.

In certain embodiments, the first stage represents introducing and optimizing weighting factors in the enhanced ECM for each load scenario. As will be explained later, these factors serve as a replacement for the equivalence factor mentioned in the previous section. Despite that, there are many efficient ECM versions in the prior art that were applied for hybrid electric vehicles, which require prior knowledge of the load profile. To address this dependency, adaptive versions of ECM have been introduced, in which the equivalence factor is adjusted according to the load profile. These may be categorized into three main adaptation principles: pattern recognition, which identifies and adjusts factors for similar load profiles using a pre-calculated database; load prediction, which forecasts future load conditions to determine the equivalence factor, often updated with a PI controller; and feedback from SOC, which uses real-time state-of-charge measurements to adapt the equivalence factor, sometimes adjusting less frequently to enhance SOC range utilization.

The present disclosure develops an enhanced version of feedback-based ECM. This is found to cope with the drone load profile fluctuations and severe spikes. Two key coefficients are introduced within the objective function of ECM. These coefficients are crucial for adjusting the weights dynamically for each of the battery power and FC power. The modified objective function is as follows:

$$F(t) = \left[\left(\lambda(t) - a \cdot \frac{H_1(t)}{k_1}\right) \cdot P_{Bat}(t) + b \cdot \frac{H_2(t)}{k_2} \cdot P_{FC}(t)\right] \cdot \Delta T \tag{5}$$

where H1(t) and H2(t) are penalty functions that represent SOC and power deviations, respectively, and k1 and k2 are constants to normalize these penalty functions. To ensure that the penalty functions respond appropriately to varying conditions, they are defined as piecewise functions as follows:

$$H_1(t) = \begin{cases} SOC_d^{min} & SOC_d(t) \le SOC_d^{min} \\ SOC_d(t) & SOC_d^{min} < SOC_d(t) < SOC_d^{max} \\ SOC_d^{max} & SOC_d^{max} \le SOC_d(t) \end{cases} \tag{6}$$

$$H_2(t) = \begin{cases} P_{FC,d}^{min} & P_{FC,d}(t) \le P_{FC,d}^{min} \\ P_{FC,d}(t) & P_{FC,d}^{min} < P_{FC,d}(t) < P_{FC,d}^{max} \\ P_{FC,d}^{max} & P_{FC,d}^{max} \le P_{FC,d}(t) \end{cases} . \tag{7}$$

where $SOC_d(t)=SOC(t)-SOC_{ref}$, and $P_{FC,d}(t)=P_{load}(t)-P_{FC}(t)$. $SOC_{ref}$ is the reference value for SOC. Additionally, $$SOC_d^{min}, SOC_d^{max}, P_{FC,d}^{min}, \text{ and } P_{FC,d}^{max}$$

are threshold values for their respective penalty functions.

In certain embodiments, parameter a represents the weight for the battery SOC deviation penalty function H1, while parameter b represents the weight for the FC power deviation penalty function H2. Adjusting the values of a and b enables controlling the emphasis over battery SOC deviation and FC power deviation. After explaining the enhanced ECM, it is essential to explain its role in the first stage of the proposed CBR-based EMS. In the first stage, an extensive study was conducted in which each of the 40 load profile scenarios (synthesized in FIGS. 3A-3B) was examined individually, each undergoing multi-objective optimization. The optimization process involved identifying the best weighting factors a and b for each load profile scenario that may minimize the drone's equivalent consumption. To achieve this, the non-dominated sorting genetic algorithm (NSGA-II) is implemented on the basis of the methodology to identify a Pareto front. The first objective is to minimize hydrogen consumption. The second objective is to minimize SOC deviation (around its reference value, 70%) to preserve battery energy for emergency situations while supporting the mission power supply, and to avoid frequent deep discharges and high charge rates, as these can accelerate battery degradation. This ensures having sufficient energy reserve to finish the mission and return to the fueling station in the event of an empty hydrogen cylinder.

Stage 2 (states extraction 514) focuses on extracting state variables corresponding to the optimized energy management results. Stage 2 takes as input the load scenarios 516 (40 profiles) and their associated optimized weighting factors 512 (40 pairs) and subjects them to simulation through the hybrid drone model 508 and the ECM model 510, as shown in simulation block 518.

During simulation, time-series data corresponding to multiple state variables are recorded. The output includes both the state variable dataset 520 and the associated fuel cell power reference value (Pfc). Each entry in the collected dataset 520 corresponds to a specific time instance and contains a plurality of state variables, including, a state-of-charge (SOC) deviation of the battery, a filtered load power, a deviation between a load power and the filtered load power, a deviation between a fuel cell power and the filtered load power, and a deviation between a battery power and a reference charging power.

Figure 6:
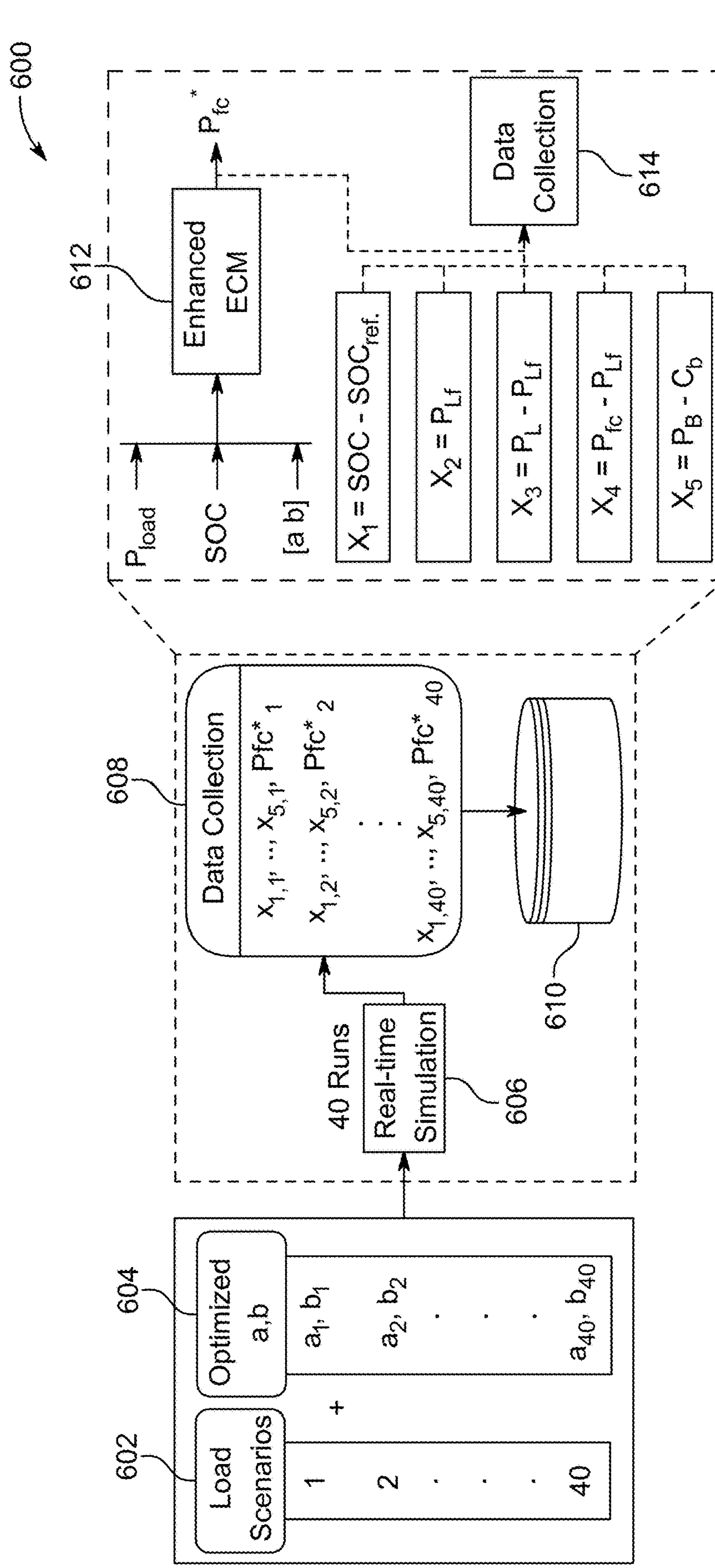
FIG. 6 illustrates a schematic diagram of the states extraction stage (stage 2), according to certain embodiments.

In the second stage, each load profile scenario with its selected optimized weighting factors obtained from stage 1 goes to a further real-time simulation to extract the required dataset that may be used by CBR later, as shown in FIG. 6.

FIG. 6 illustrates a schematic diagram 600 of the states extraction stage (stage 2), according to certain embodiments. The schematic diagram 600 represents the process of generating a comprehensive dataset that captures the dynamic behavior of the hybrid UAV powertrain through simulation and enhanced equivalent consumption minimization (ECM) modeling. The extracted dataset is subsequently used to train and optimize the case-based reasoning (CBR)-based energy management system (EMS).

The schematic diagram 600 begins with a plurality of load scenarios 602, representing multiple flight power demand profiles. Each load scenario corresponds to a unique set of operating conditions of the UAV, such as changes in propulsion demand, payload variations, or flight maneuvers. A total of 40 load scenarios are synthesized to capture a wide range of operational behaviors. Each load scenario is processed in conjunction with a corresponding pair of optimized weighting factors 604, represented as parameters ($a_1$, $b_1$) to ($a_{40}$, $b_{40}$), which are derived from the preprocessing and optimization stage (Stage 1). The weighting factors are obtained through a non-dominated sorting genetic algorithm (NSGA-II) to achieve minimal hydrogen consumption and minimal state-of-charge (SOC) deviation of the battery.

The load scenarios 602 and their associated optimized weighting factors 604 are input to a real-time simulation module 606, which performs 40 independent simulation runs, each representing one load scenario. The simulations model the dynamic interaction between the hybrid UAV's fuel cell, battery, and supercapacitor under the control of the enhanced ECM strategy. During the simulation, the data collection block 608 continuously records time-series data, including both system states and the desired fuel cell power reference values (Pfc*). The collected data are stored in a dataset 610 for further processing.

To ensure accurate prediction and representation of the enhanced ECM behavior, the dataset 610 includes state variables that capture real-time variations in the load characteristics and the dynamic behavior of each hybrid energy source. Intuitively, the state variables may consist of the instantaneous load power and the battery SOC. However, it was found that these state variables are insufficient to characterize the dynamic behaviour. Accordingly, five different time-series state variables are defined to better characterize the dynamic behaviour. five state variables include SOC deviation ($SOC_d(t)$), the filtered load ($P_{Lf}(t)$), the deviation between the load and filtered load ($P_L(t)-P_{Lf}(t)$), the deviation between the FC power and filtered load ($P_{FC}(t)-P_{Lf}(t)$), and the deviation between the battery power and its preferable reference charging power ($P_{Bat}(t)-c_b$), where $c_b$ is selected based on the battery technical characteristics. Note that $P_{Lf}$ is obtained by passing $P_L$ into a low-pass filter.

These state variables are dynamically calculated within the enhanced ECM 612, which receives as inputs the load power ($P_{Load}$), the battery SOC, and the optimized weighting factors [a, b]. The enhanced ECM 612 computes the desired fuel cell power reference (Pfc*) while maintaining optimal energy distribution among the fuel cell, battery, and supercapacitor.

The data collection block 614 records the computed state variables ($X_1$ to $X_s$) and the corresponding desired fuel cell power (Pfc*) at each simulation time step, thereby forming a detailed dataset that accurately reflects the UAV's energy dynamics.

Upon completion of this stage, the dataset size is m×n, where m is the number of scenarios (40) multiplied by the simulation time of a scenario (530 s) multiplied by the sampling rate (10 samples/s), and n is the number of states plus one. Consequently, each row of the dataset is representative of a specific time instance and contains six data points, the five state variables and the desired fuel cell power reference.

Referring back to FIG. 5, stage 3 represents the dataset reduction phase 522, where data dimensionality and redundancy are minimized to improve computational efficiency during real-time execution. The collected data 520, which may include m×6 entries (representing time-series instances and state variables), are subjected to k-means clustering 524 to partition the state variable dataset into k clusters.

Each cluster is represented by a centroid that characterizes a unique operating condition of the UAV. The clustering process reduces the size of the dataset while preserving key state-space information relevant for energy management. The output of this stage is the reduced dataset 526 (K×6), which forms a representative set of historical cases used for real-time decision-making in the subsequent stage. In stage 3, the extensive dataset obtained from stage 2 undergoes an offline stage of data reduction to determine the minimum required sample size for effective energy management behaviour. This is done by k-means clustering, which partitions the data into k clusters, thereby identifying a representative dataset that captures essential information from the original dataset, thus reducing computational complexity. This is especially important because drones have limited computational resources, which makes CBR-based EMS particularly attractive for such an application. By implementing k-means clustering in this stage, the dataset size is reduced from m×n to a representative dataset of the size k×n, where k<<m. This concludes with the offline stages. The reduced dataset obtained from this stage 3 is the data repository that may be used online (aboard the flight) in stage 4.

In stage 4, which corresponds to the real-time implementation phase 528, where the CBR-based EMS is deployed onboard the UAV. Real-time state measurements from current states (t) block 530, representing the UAV's instantaneous operating conditions (current states at time t), are continuously acquired from onboard sensors and controllers.

The CBR-based EMS 532 receives the real-time state measurements and compares them with the reduced data 526 derived from the offline stages. The CBR-based EMS 532 identifies a plurality of historical cases from the reduced data 526 based on a similarity metric that quantifies the degree of resemblance between the current case and stored cases. The similarity metric is computed as a weighted Euclidean distance across the plurality of state variables. A k-nearest neighbors (k-NN) algorithm is employed to select the most relevant historical cases, with smaller distances indicating greater similarity. The weights in the similarity metric represent the relative importance of each state variable.

The CBR-based EMS 532 applies a weighted average estimation based on inverse-distance weighting to compute the real-time fuel cell power reference value Pfc*(t) 534. This real-time calculated value determines the power allocation among the fuel cell, the battery, and the supercapacitor, ensuring optimal performance, efficient fuel utilization, and balanced SOC levels during flight.

In certain embodiments, in the real-time implementation stage, the reduced dataset consists of k cases, where "a case" is a CBR terminology that represents a time instance row of the dataset. This repository uses previously solved problems to address new ones by identifying and adapting the most similar cases. The CBR process includes four steps: case retrieval, reuse, revision, and retention. The present disclosure introduces a modified version of CBR that emphasizes certain adjustments to the initial two phases. The retrieval phase identifies historical cases using similarity measurement and K-Nearest Neighbors, while the reuse phase adapts them through weight calculation and weighted average estimation. Normalization is essential to ensure high-quality base cases in CBR, allowing fair comparisons during similarity calculations. Min-Max Normalization rescales data values between 0 and 1, preventing attributes with different scales from dominating. The similarity measurement uses the weighted Euclidean distance to compare the new case with historical ones, where a weight is assigned to each input attribute (i.e. state variable) based on its significance. The weighted Euclidean distance formula is:

$$d_j(t)=\sqrt{\sum_i w_i\left(X_i^{nor}(t)-x_{ij}^{nor}\right)^2} \tag{8}$$

where $x_{ij}^{nor}$ is the $i^{th}$ normalized state of the historical case $j$, $X_i^{nor}(t)$ is the $i^{th}$ normalized state of the real-time case, $w_i$ is the weight for the $i^{th}$ normalized state, and $d_j(t)$ is the weighted Euclidean distance at time t between the real-time case and historical case j.

Afterward, the K-Nearest Neighbors (KNN) algorithm is used to find the most similar historical cases to the real-time case. The algorithm ranks distances between the new and historical cases, selecting the $k_n$ nearest cases with the smallest distances. This step is essential for identifying the most relevant cases for adaptation in later phases of CBR. The formula is:

$$KN_j(t)=\operatorname{argmin}_{\{x_{i,j}\in X\}}\{d_j(t)\}_{j=1}^{k_n} \tag{9}$$

where $KN_j(t)$ represents the set of $k_n$ nearest neighbors to the real-time case, X is the set of all cases, and $k_n$ is set to 3. The argmin function returns the indices of the $k_n$ cases with the smallest distances, identifying the nearest neighbors.

Finally, the weighted average estimation is performed to estimate the target value P*fc, accounting for the calculated weights to ensure cases with higher weights have a greater impact on the estimation. The weighted average formula considers the varying importance of selected historical cases and is given by:

$$P_{FC}^*(t)=\sum_{j=1}^{k_n}\frac{P_{FCj}}{KN_j(t)}\div\sum_{j=1}^{k_n}\frac{1}{KN_j(t)} \tag{10}$$

where $P_{FC}^*(t)$ represents the estimated value at time t, weights are determined based on the inverse of distances between the real-time case and each of the neighbouring historical cases, $KN_j(t)$ is the distance to the $j^{th}$ neighbouring historical case. This method ensures that closer cases exert a stronger influence on the estimation.

The disclosed CBR-based EMS framework 500 was implemented and simulated on a 1-kW FC hybrid system using Simulink/SPS. The specifications and parameters are detailed in Table II.

TABLE II

| Specifications and parameters | | | |
|---|---|---|---|
| PEM Fuel Cell | | Hydrogen Tank | |
| Max peak power | 1000 W | Capacity ($H_2$) | 2 L/42 g |
| Max power | 650 W | Weight | 1.46 kg |
| Output voltage | 19.6-25.2 V | Dimensions (mm) | D: 114, L: 371 |
| Stack efficiency | 50% | Hydrogen regulator | |
| Weight | 810 g | Weight | 250 g |
| Dimensions (mm) | 196 × 88 × 140 | Output pressure | 0.5 ± 0.25 bar |
| Li-ion Battery | | Supercapacitor | |
| Capacity | 4000 mAh | Capacitance | 1.28 F |
| Nominal voltage | 22.2 V | Voltage | 65 V |
| Weight | 450 g | Weight | 70 g |
| Dimensions (mm) | 140 × 30 × 40 | Dimensions (mm) | 53 × 79 × 27 |
| Parameters | | | |
| $SOC_d^{min}$ &$SOC_d^{max}$ | −5 & 5% | $k_1$ & $k_2$ | 100 & 10,000 |
| $p_{FC,d}^{min}$ &$P_{FC,d}^{max}$ | −500 & 500 W | $SOC_{ref}$ | 70% |

Figure 7:
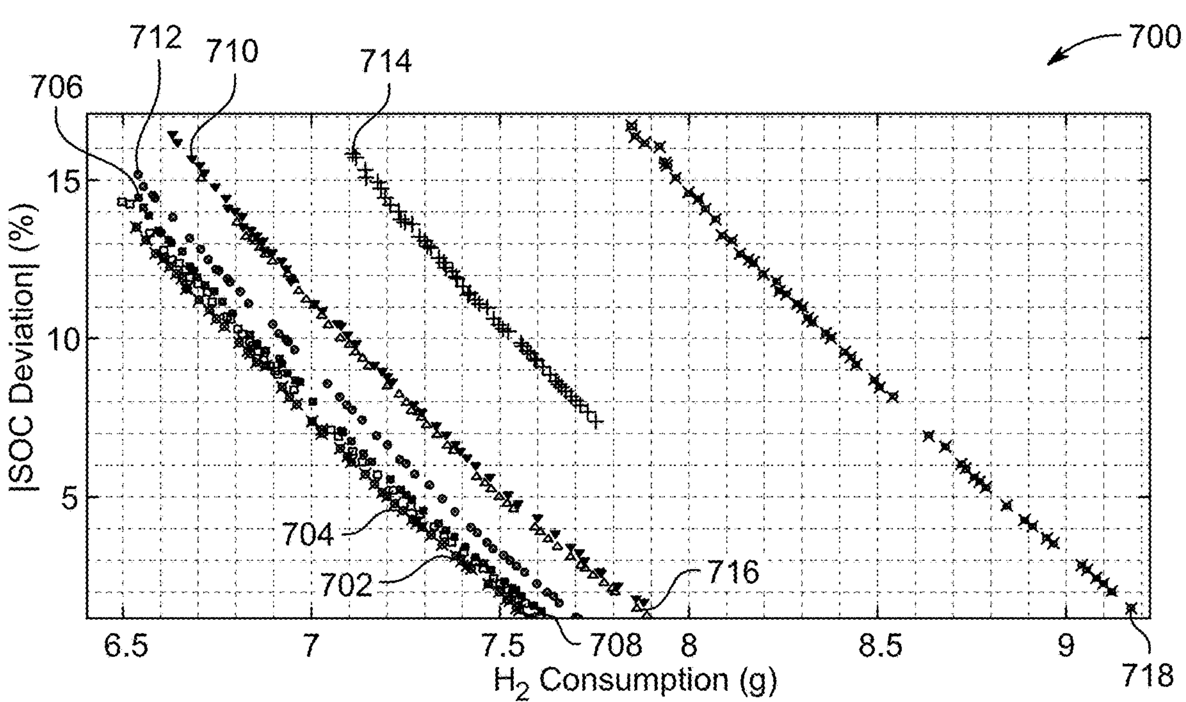
FIG. 7 is a plot representing Pareto fronts for payload modulation (PLM), fast-dynamics modulation (FDM), and slow-dynamics modulation (SDM) methods under different offsets (W) and masses (g), according to certain embodiments.

FIG. 7 is a plot 700 representing Pareto fronts for payload modulation (PLM), fast-dynamics modulation (FDM), and slow-dynamics modulation (SDM) methods under different offsets (W) and masses (g), according to certain embodiments. The plot 700 illustrates the results of the multi-objective optimization process executed in the first stage of the case-based reasoning (CBR)-based energy management system (EMS) framework 500. During the first stage, 40 diverse load profile scenarios were examined, and each scenario underwent non-dominated sorting genetic algorithm (NSGA-II)-based multi-objective optimization to determine the optimal weighting factors (a, b) of the equivalent consumption minimization (ECM) model.

As shown in FIG. 7, the plot 700 displays the Pareto fronts for sample load scenarios generated by the PLM, FDM, and SDM methods under different offset and payload configurations. Each Pareto front in the FIG. 7 represents the trade-off relationship between two competing objectives: hydrogen consumption (measured in grams) and the absolute state-of-charge (SOC) deviation (measured in percentage). The data points 702-718 correspond to Pareto-optimal solutions obtained for different modulation and offset values. For example, data point 702 corresponds to FDM 50, data point 704 corresponds to SDM 50, data point 706 corresponds to FDM 100, data point 708 corresponds to SDM 100, data point 710 corresponds to FDM 200, data point 712 corresponds to SDM 200, data point 714 corresponds to FDM 300, data point 716 corresponds to SDM 300, and data point 718 corresponds to PLM 1500.

The results clearly indicate that as the offset or payload value increases, a greater amount of hydrogen is required to maintain the battery at a desired SOC level. For scenarios generated using the FDM and SDM methods, the difference in performance between the two methods becomes increasingly significant as the offset value increases. This trend arises because, under FDM scenarios, the battery and supercapacitor must respond to rapid load variations, handling the majority of the transient power fluctuations. Consequently, these components undergo more frequent charging and discharging cycles, resulting in higher cumulative energy losses due to conversion inefficiencies and internal resistance effects.

For example, when the FDM method is applied with a 300 W offset, represented by data points 714, the minimum achievable SOC deviation stabilizes around 7%. This finding demonstrates that beyond a certain threshold of load dynamics, the hybrid powertrain system experiences difficulty maintaining the battery SOC within the desired operational limits. Such degradation in SOC regulation performance is attributed to multiple system constraints, including the ramping limit of the fuel cell, the maximum allowable charging power of the battery, and the limited energy capacity of the supercapacitor.

Each Pareto front plotted in FIG. 7 corresponds to a set of optimized combinations of SOC deviation and hydrogen consumption for a given load scenario. Every point along these Pareto fronts represents a unique pair of weighting factors (a, b) optimized for that specific trade-off condition. The criteria for selecting the final weighting factors from a given Pareto front are determined based on the balance between the inversely related objectives, minimizing hydrogen ($H_2$) consumption while maintaining SOC deviation as close as possible to zero. In the exemplary implementation, the weighting factors corresponding to an SOC deviation closest to 0% were selected to ensure stable battery operation and improved fuel efficiency across all load scenarios.

In the second stage of the EMS framework, the 40 load scenarios and their corresponding optimized weighting factors were simulated to extract the state variables and fuel cell power references. This process yielded a dataset comprising approximately 212,000 cases, capturing the time-series behavior of the hybrid UAV system across all flight and loading conditions. To ensure computational efficiency, the third stage employed K-means clustering to perform dataset reduction using varying values of k. The clustering reduced redundancy and identified representative operating states while preserving essential behavioral information.

As an offline part of the fourth stage, the relative importance of the five input state variables was assessed to determine the optimal weights used in the weighted Euclidean distance for similarity measurement during real-time case-based reasoning. The NSGA-II algorithm is employed again, using a test load profile to fine-tune these weights for each value of k ranging from three to six. This iterative optimization ensured that the final CBR-based EMS achieved both computational efficiency and accurate energy management performance during real-time UAV operation.

Accordingly, FIG. 7 visually demonstrates the effectiveness of the multi-objective optimization process in defining trade-offs between SOC stability and hydrogen efficiency, forming the foundation for the subsequent state extraction, data reduction, and real-time implementation stages of the disclosed energy management framework 500.

Figure 8:
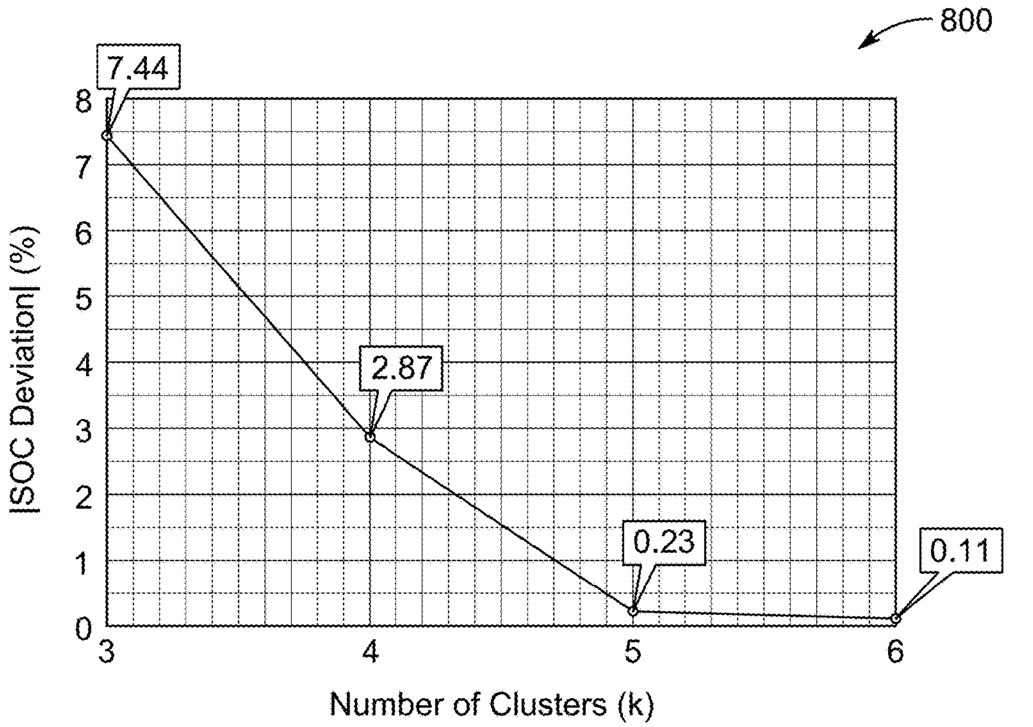
FIG. 8 is a plot representing a variation of SOC deviation with different numbers of clusters (k), according to certain embodiments.

FIG. 8 is a plot 800 representing a variation of SOC deviation with different numbers of clusters (k), according to certain embodiments. The plot 800 illustrates the performance of the case-based reasoning (CBR)-based energy management system (EMS) in terms of SOC deviation at the end of a flight mission using a test load profile for each reduced dataset size. The horizontal axis represents the number of clusters (k) obtained through the K-means clustering algorithm during the dataset reduction stage, while the vertical axis represents the absolute SOC deviation (in percentage) observed at the completion of the mission.

The plot 800 demonstrates how the EMS performance improves as the number of clusters increases, indicating that finer clustering allows more accurate case representation and, consequently, better energy allocation during flight. The data points on the curve correspond to k values of 3, 4, 5, and 6, with respective SOC deviation values of 7.44%, 2.87%, 0.23%, and 0.11%. As shown in FIG. 8, the SOC deviation decreases progressively with increasing k, reflecting a direct improvement in the accuracy of the CBR-based decision-making process.

Clearly, k with the value of 6 represents the point where the SOC deviation becomes acceptably low, demonstrating a balance between dataset size and control precision. Beyond this value, increasing the number of clusters would yield negligible performance gain while increasing computational overhead. Therefore, k=6 is selected as the optimal configuration for real-time implementation of the CBR-based EMS.

The optimized weights for each of the five input state variables, derived during the fine-tuning process using a test load profile, are determined to be 0.58, 0.47, 0.51, 0.94, and 0.28, respectively. These weights correspond to the relative importance of the SOC deviation, filtered load power, deviation between load and filtered load, deviation between fuel cell power and filtered load, and deviation between battery power and reference charging power.

Figure 9:
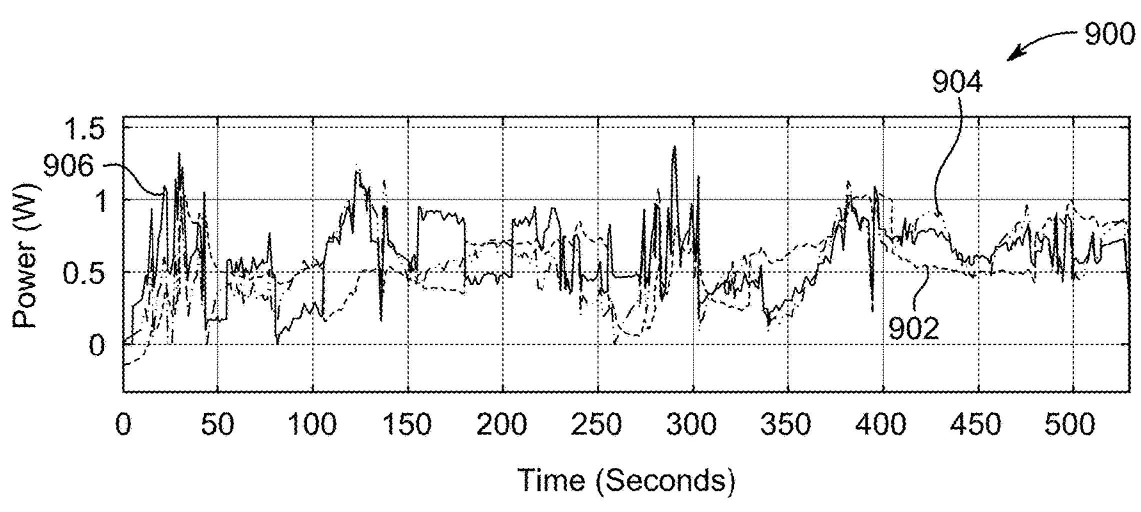
FIG. 9 is a plot illustrating three different load profiles for EMS evaluation, according to certain embodiments.

FIG. 9 is a plot 900 illustrating three different load profiles for EMS evaluation, according to certain embodiments. The plot 900 represents the power demand variations of three test load scenarios, designated as Load 1 (902), Load 2 (904), and Load 3 (906), over a simulation duration of approximately 500 seconds. The vertical axis represents power in watts (W), while the horizontal axis represents time in seconds(s). Each curve corresponds to a distinct dynamic load condition applied to the hybrid UAV powertrain to evaluate the performance and adaptability of the case-based reasoning (CBR)-based EMS framework.

For testing, three new load profiles, Load 1 (902), Load 2 (904), and Load 3 (906), are assumed, which are distinct from the 40 load scenarios previously used for optimization and dataset generation in the preprocessing and state extraction stages. As illustrated in FIG. 9, these new load profiles serve as independent test cases for validating the robustness and generalization capability of the disclosed EMS framework. Each load profile exhibits unique temporal characteristics and dynamic variations to ensure comprehensive evaluation of system adaptability and response accuracy under unseen operating conditions.

The test load profiles shown in FIG. 9 simulate various operational conditions of the UAV, such as hovering, acceleration, deceleration, and payload changes, that directly influence the instantaneous power demand from the hybrid powertrain. Load 1 (902) represents a relatively smooth and moderate power variation scenario, emulating steady flight with minor dynamic transitions. Load 2 (904) exhibits intermediate variability, simulating flight maneuvers with occasional rapid power demands. Load 3 (906) demonstrates the most aggressive and highly dynamic load fluctuations, replicating conditions such as high-frequency throttle changes, rapid altitude adjustments, or payload modulation events. These load profiles collectively ensure that the EMS is tested across a wide spectrum of real-world UAV operating conditions.

Each of the three profiles is used to evaluate the performance of the optimized CBR-based EMS, particularly focusing on the system's ability to maintain the battery's state-of-charge (SOC) within acceptable limits while minimizing hydrogen consumption. The CBR framework utilizes the reduced dataset obtained from earlier stages of the EMS design (as shown in FIG. 5) and applies real-time similarity-based reasoning to manage power allocation among the fuel cell, battery, and supercapacitor under these diverse load scenarios.

FIGS. 10A-10D illustrate comparative power distribution plots for different energy management strategies (EMSs) implemented under the first load profile (Load 1), according to certain embodiments. Each plot represents the temporal evolution of power contributions from the fuel cell (Pfc), battery (Pb), and supercapacitor (Psc) in supplying the total load power (Pload) during a simulated UAV flight mission. The vertical axis indicates power (W), while the horizontal axis represents time (seconds).

Figure 10A:
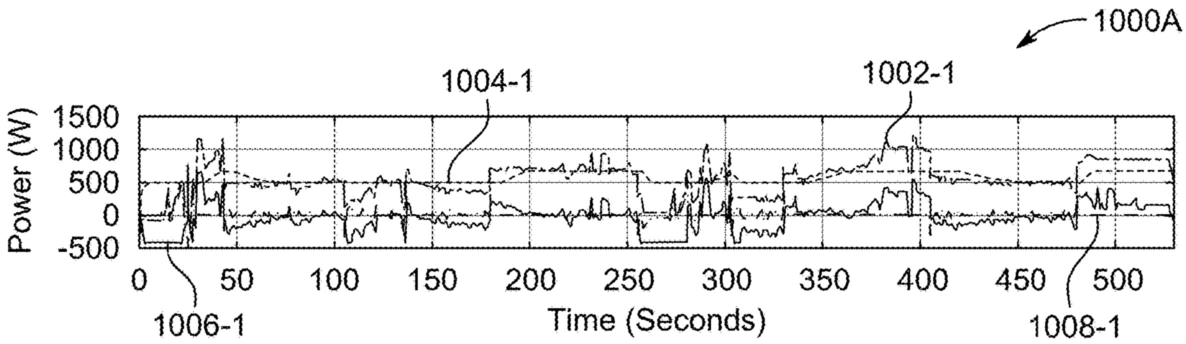
FIG. 10A is a plot illustrating power distribution for different EMSs under the first load profile using the optimized rule-based (ORB) strategy, according to certain embodiments.

FIG. 10A is a plot 1000A illustrating power distribution for different EMSs under the first load profile using the optimized rule-based (ORB) strategy, according to certain embodiments. In this case, the fuel cell power (Pfc) 1004-1 exhibits an almost flat output profile centered around 500 W, with minor deviations observed only when the load power (Pload) 1002-1 exceeds this level. The battery power (Pb) 1006-1 and supercapacitor power (Psc) 1008-1 provide auxiliary compensation during transient load variations, although their overall participation remains limited.

This behavior indicates that the ORB strategy does not achieve a high degree of interaction between the fuel cell output and real-time load variations. As a result, the strategy struggles to maintain the battery state-of-charge (SOC) near its reference value (70%) at the end of the mission. The lack of adaptive coordination between energy sources results in a suboptimal energy balance and reduced SOC stability, as reflected by the low responsiveness of the fuel cell during dynamic power demands.

Figure 10B:
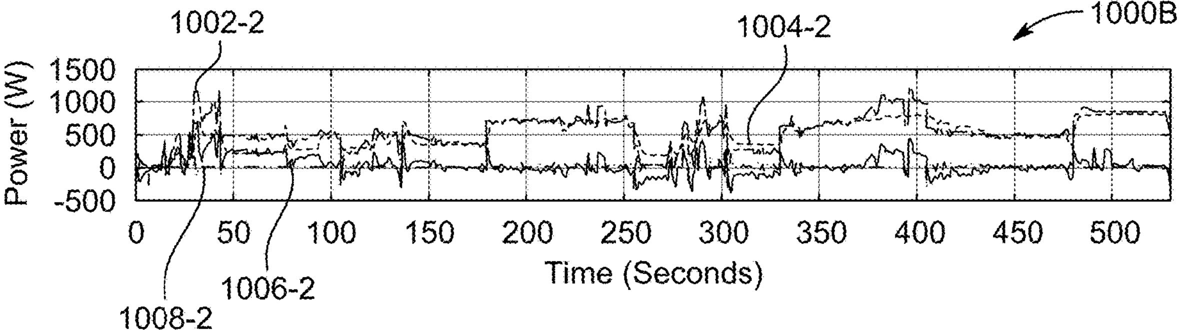
FIG. 10B is a plot illustrating power distribution under the first load profile using the fuzzy logic (FL) strategy, according to certain embodiments.

FIG. 10B is a plot 1000B illustrating power distribution under the first load profile using the fuzzy logic (FL) strategy, according to certain embodiments. In this case, the fuel cell power 1004-2 demonstrates abrupt reactions to variations in the load power 1002-2, leading to a noticeably rough and oscillatory power trajectory. The battery power 1006-2 and supercapacitor power 1008-2 attempt to compensate for fast transient power surges but cannot fully mitigate the fluctuations caused by the aggressive response of the fuel cell.

While the fuzzy logic strategy provides better adaptability compared to ORB, the sharp and frequent power transitions of the fuel cell can negatively affect its long-term durability and efficiency. These rapid fluctuations are undesirable, as they may accelerate degradation due to thermal and electrochemical stress. Accordingly, it is advisable to constrain the fuel cell current ramping limit and rely more on the battery and supercapacitor to buffer transient fluctuations for improved operational stability.

Figure 10C:
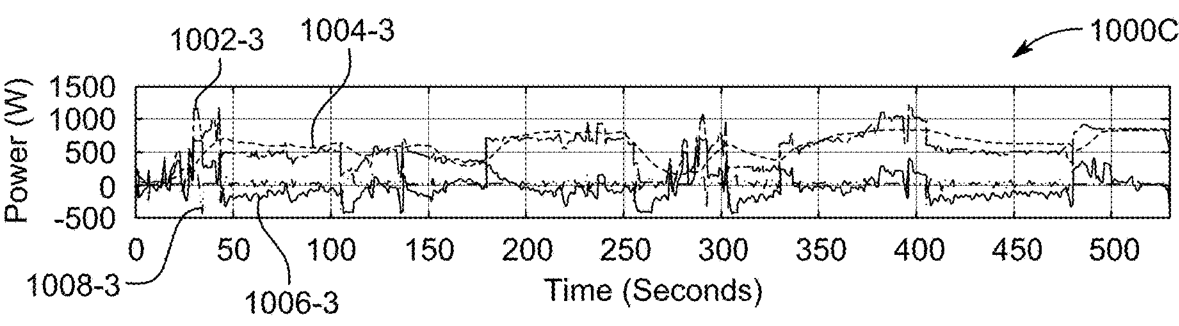
FIG. 10C is a plot illustrating power distribution under the first load profile using the equivalent consumption minimization (ECM) strategy, according to certain embodiments.

FIG. 10C is a plot 1000C illustrating power distribution under the first load profile using the equivalent consumption minimization (ECM) strategy, according to certain embodiments. The fuel cell power 1004-3 exhibits slightly more fluctuation compared to the ORB strategy but significantly less than the FL method. These controlled variations result from the optimization algorithm embedded within the ECM strategy, which dynamically determines the fuel cell power reference value that minimizes hydrogen consumption at each sampling instant. The load power 1002-3, battery power 1006-3, and supercapacitor power 1008-3 collectively maintain a balanced power distribution, enabling improved fuel utilization without excessive transient stress on the fuel cell.

Overall, the ECM strategy achieves a smoother fuel cell power curve relative to the fuzzy logic method, which is beneficial for fuel cell health and longevity. However, it still exhibits moderate variation in dynamic phases due to real-time optimization adjustments.

Figure 10D:
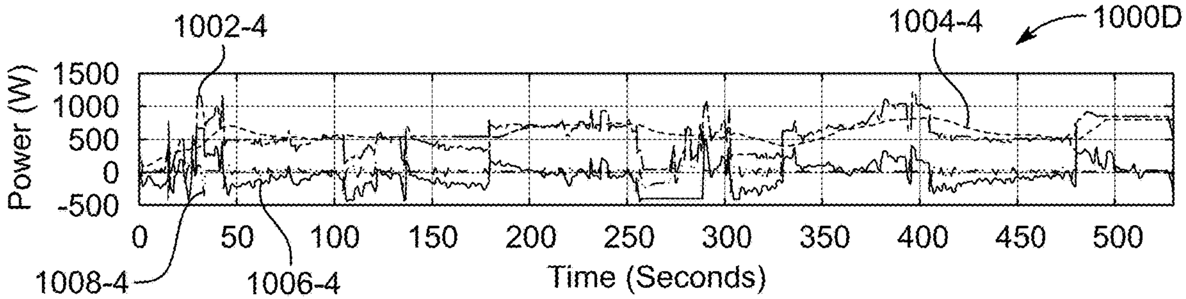
FIG. 10D is a plot illustrating power distribution under the first load profile using the case-based reasoning (CBR) strategy, according to certain embodiments.

FIG. 10D is a plot 1000D illustrating power distribution under the first load profile using the case-based reasoning (CBR) strategy, according to certain embodiments. In this configuration, the fuel cell power 1004-4 demonstrates the smoothest and most stable profile among all compared strategies, while efficiently responding to load variations 1002-4 throughout the entire mission duration. The battery power 1006-4 and supercapacitor power 1008-4 exhibit well-coordinated behavior, jointly handling short-term and high-frequency load fluctuations.

This power coordination highlights the effectiveness of the disclosed CBR-based EMS in achieving real-time adaptability and efficient energy sharing among the fuel cell, battery, and supercapacitor. The smooth fuel cell response not only ensures efficient power management but also contributes to enhanced fuel cell durability, as the degradation rate of the fuel cell is directly proportional to the magnitude and frequency of transient load changes. Furthermore, the CBR-based EMS outperforms all other evaluated strategies in maintaining the SOC deviation at the lowest possible level by the end of the mission, confirming its advantage in long-term UAV endurance and system reliability.

Figure 11A:
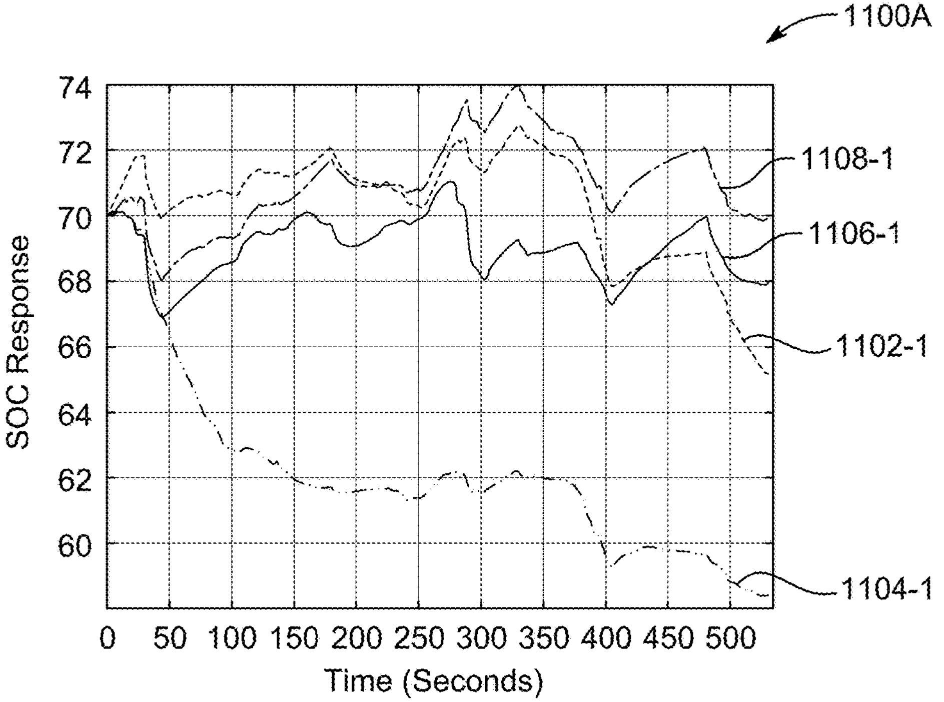
FIG. 11A is a plot illustrating the SOC response (%) for the first load profile, according to certain embodiments.
Figure 11B:
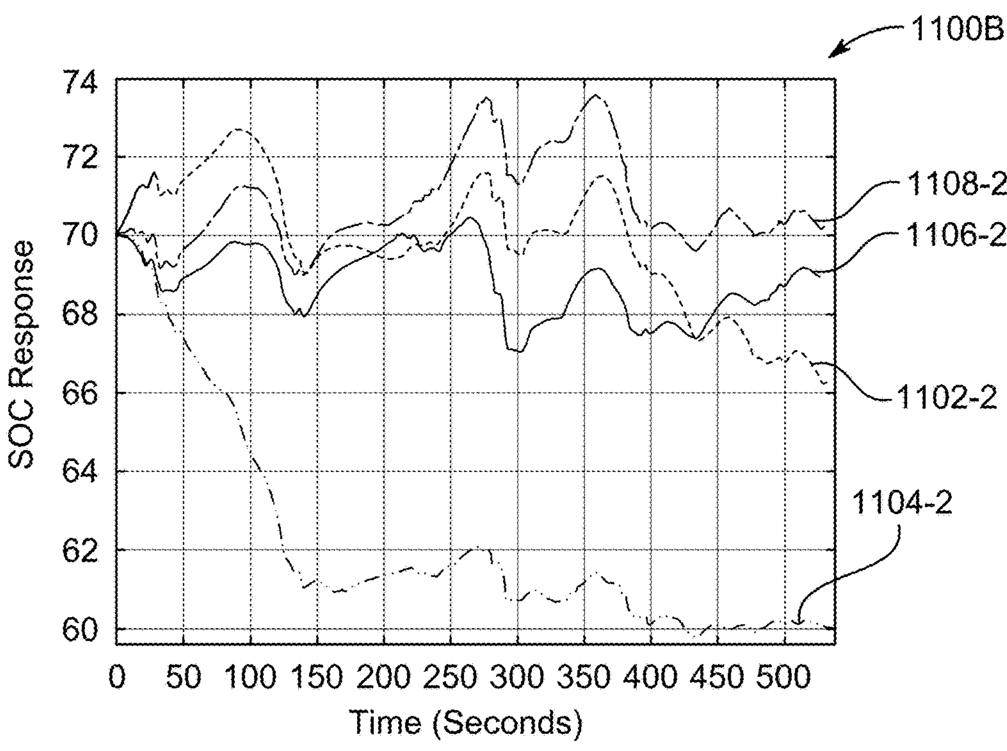
FIG. 11B is a plot illustrating the SOC response (%) for the second load profile, according to certain embodiments.
Figure 11C:
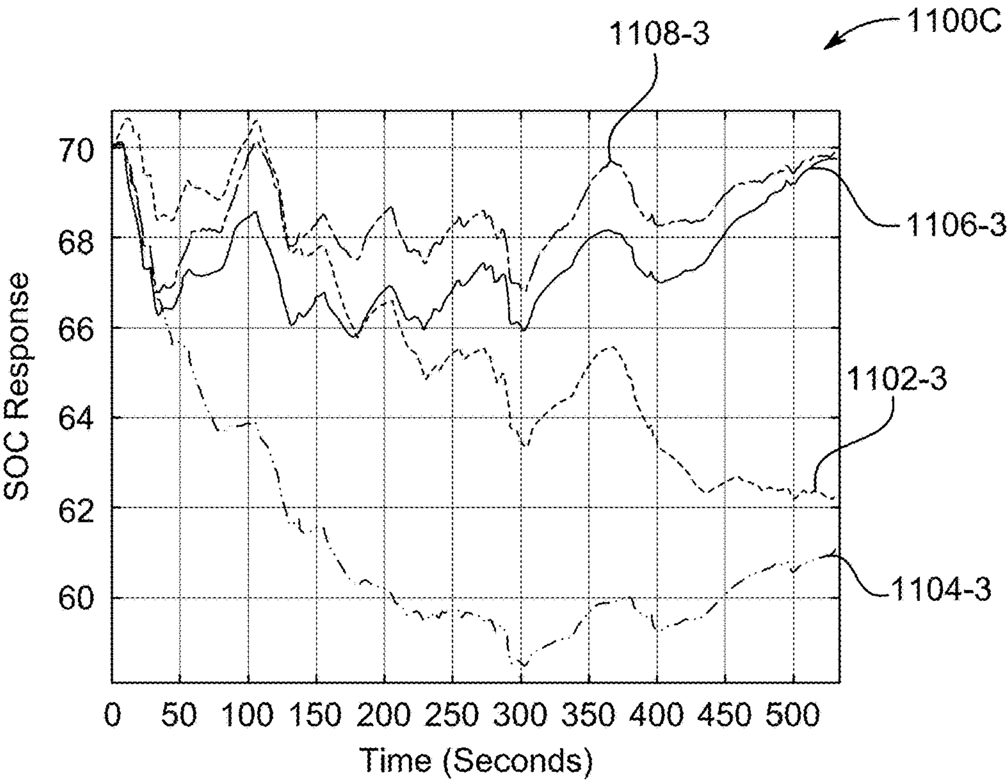
FIG. 11C is a plot illustrating the SOC response (%) for the third load profile, according to certain embodiments.

FIGS. 11A-11C collectively illustrate SOC (state-of-charge) response curves corresponding to three distinct load conditions, referred to as 1100A, 1100B, and 1100C, respectively. Each figure compares the SOC performance of four energy management strategies-namely, Optimal Rule-Based (ORB), Fuzzy Logic (FL), Equivalent Consumption Minimization (ECM), and the proposed Case-Based Reasoning (CBR) approach. The SOC responses are represented by reference numerals 1102-1, 1104-1, 1106-1, and 1108-1 for Load 1 (FIG. 11A); 1102-2, 1104-2, 1106-2, and 1108-2 for Load 2 (FIG. 11B); and 1102-3, 1104-3, 1106-3, and 1108-3 for Load 3 (FIG. 11C).

As shown in FIG. 11A, corresponding to load profile 1100A, the SOC response curve 1108-1 associated with the CBR method maintains the SOC level close to the reference value throughout the operation period, exhibiting negligible deviation. In contrast, the ORB method (1102-1) and the FL method (1104-1) show pronounced SOC reductions over time, indicating insufficient adaptability to dynamic variations in load demand. The ECM method (1106-1) performs moderately well, maintaining SOC within approximately ±2% of the reference value, though with increased computational demand due to its continuous optimization procedure.

FIG. 11B, representing load profile 1100B, similarly demonstrates that the CBR-based response 1108-2 sustains SOC stability near the reference value throughout the duration of the test. ECM (1106-2) follows closely, while ORB (1102-2) and FL (1104-2) exhibit larger deviations, leading to a steady decline in SOC. FIG. 11C, corresponding to load profile 1100C, reinforces this trend, wherein the CBR curve 1108-3 maintains SOC within the target range with minimal variation, while ORB (1102-3) and FL (1104-3) experience significant SOC drops indicative of poor adaptation to high-load scenarios.

The performance metrics corresponding to the three load conditions are summarized in Table III. The parameters include hydrogen consumption, final SOC percentage, expected endurance, and overall efficiency. The CBR method achieves the most desirable trade-off among these metrics. Specifically, the CBR strategy maintains the SOC reference with almost zero deviation across all profiles while achieving competitive hydrogen consumption and superior endurance. The ECM method shows comparable hydrogen consumption but at the cost of higher computational complexity. The ORB and FL methods, although consuming slightly less hydrogen, achieve this by allowing significant SOC deviation, thereby reducing endurance and overall operational stability.

Across all load profiles, the CBR method demonstrates strong robustness and adaptability, ensuring SOC stability close to the reference value. The ECM strategy achieves moderate stability but requires substantially greater computational resources due to its optimization-based nature. ORB and FL exhibit notable SOC degradation, making them less suitable for long-duration missions or variable load environments.

In terms of hydrogen consumption, the CBR method records values slightly higher than ECM (by no more than 0.1 g) under load profiles 1100B and 1100C, attributed to the method's proactive maintenance of the reference SOC. This marginal increase is acceptable given the superior SOC control achieved. ORB and FL, despite showing slightly reduced hydrogen consumption, do so at the expense of SOC precision and endurance, highlighting their limited adaptability.

Regarding efficiency, both CBR and ECM consistently outperform ORB and FL across all load conditions, with CBR achieving efficiency levels ranging between approximately 82.3% and 82.9%. These results confirm that the CBR approach not only provides high energy efficiency but also requires significantly lower computational effort than ECM, further enhancing its practical feasibility for real-time applications.

Thus, the disclosed CBR-based EMS achieves the most desirable performance by ensuring smooth fuel cell operation, low SOC deviation, and enhanced energy efficiency, thereby representing a significant improvement in hybrid UAV power management under dynamically changing flight conditions.

The ORB and FL methods again exhibit substantial SOC degradation toward the mission's end, indicating limited adaptability and insufficient dynamic coordination among the fuel cell, battery, and supercapacitor. The reduced SOC in these cases signifies potential battery depletion risks during prolonged missions.

In certain embodiments, to ensure a fair comparison between the disclosed EMS and the benchmark methods, four performance metrics are used for evaluation: hydrogen consumption, final SOC, expected endurance, and overall efficiency. The hydrogen consumption (grams) and the overall efficiency (%) are given by:

$$ConsH_2 = \frac{N}{F}\int_0^{T_{sim}} i_{fc}(t)\cdot dt \tag{11}$$

$$\eta_{total} = \frac{\int_0^{T_{sim}} P_{Load}(t)\cdot dt}{\int_0^{T_{sim}} [P_{FC}(t) + P_{Bat}(t) + P_{SC}(t)]\cdot dt} \tag{12}$$

where N is the number of cells, F is the Faraday constant, $T_{sim}$ is the simulation time, and $P_{SC}$ is the SC power.

The estimated endurance of the hybrid drone is given by:

$$T_{endurance} = \frac{E_{total}}{\int_0^{T_{sim}} P_{load}(t)\cdot dt}\cdot T_{sim} \tag{13}$$

where $E_{total}$ is the total usable energy from the FC, battery, and SC. The denominator represents the total energy consumed. The equation estimates the drone's total endurance based on the available energy, while accounting for efficiency losses.

The performance metrics for the three load profiles are listed in Table III.

TABLE III

Summary of the performance metrics results

| | ORB | FL | ECM | CBR |
|---|---|---|---|---|
| | Load 1 | | | |
| $H_2$ consumption (g) | 7.37 | 6.66 | 7.71 | 7.84 |
| SOC final (%) | 65.20 | 58.47 | 67.96 | 69.91 |
| Expected endurance (min) | 64.95 | 64.63 | 64.89 | 66.68 |
| Overall efficiency (%) | 80.71 | 80.32 | 80.64 | 82.86 |
| | Load 2 | | | |
| $H_2$ consumption (g) | 7.51 | 6.87 | 7.80 | 7.95 |
| SOC final (%) | 66.27 | 60.16 | 68.98 | 70.22 |
| Expected endurance (min) | 70.07 | 69.54 | 70.22 | 71.79 |
| Overall efficiency (%) | 80.32 | 79.31 | 80.49 | 82.29 |
| | Load 3 | | | |
| $H_2$ consumption (g) | 7.84 | 7.65 | 8.65 | 8.64 |
| SOC final (%) | 62.28 | 61.11 | 69.94 | 69.89 |
| Expected endurance (min) | 70.05 | 69.92 | 70.78 | 71.91 |
| Overall efficiency (%) | 80.30 | 80.15 | 81.14 | 82.43 |

For SOC responses (see FIGS. 11A-11C), the CBR method consistently achieved the desired reference SOC with almost 0% deviation across all profiles, making it the most reliable option. Although ECM exhibited minor SOC deviations (up to 2% across all profiles), its high computational demand limits its effectiveness. ORB and FL, on the other hand, led to significant SOC declines, making them less suitable for long missions. Although ORB performed efficiently in the study, where its parameters were optimized for a specific load profile, it displays poorer adaptability to new load scenarios, resulting in inadequate SOC maintenance.

Hydrogen consumption was similar for CBR and ECM, though CBR showed a slightly higher consumption in the second and third load profiles (by no more than 0.1 g). This minor increase is due to CBR's effective maintenance of SOC close to its reference value, while ECM experienced slight deviations. The costs and energy associated with ECM's online optimization calculations are not included here. In contrast, ORB and FL, despite showing reduced hydrogen consumption, achieved this at the cost of notable SOC deviations, indicating their lower adaptability to dynamic load scenarios. Thus, CBR offers a better balance between hydrogen consumption and SOC management compared to the other methods.

In terms of efficiency, both ECM and CBR consistently outperform ORB and FL across all load profiles, with CBR achieving competitive efficiency values between 82.3% and 82.9%, highlighting its effectiveness. This analysis does not account for the reduced computational demand of CBR, further emphasizing its advantages. ORB and FL showed slightly lower efficiency. Regarding endurance, CBR demonstrates the longest endurance, ranging from 66.7 to 71.9 minutes, proving its capability to sustain drone operations over extended periods. ECM follows with intermediate endurance values. In contrast, ORB and FL have slightly lower endurance and struggle with maintaining battery SOC close to its reference value, potentially leading to battery depletion during the mission.

Figure 12:
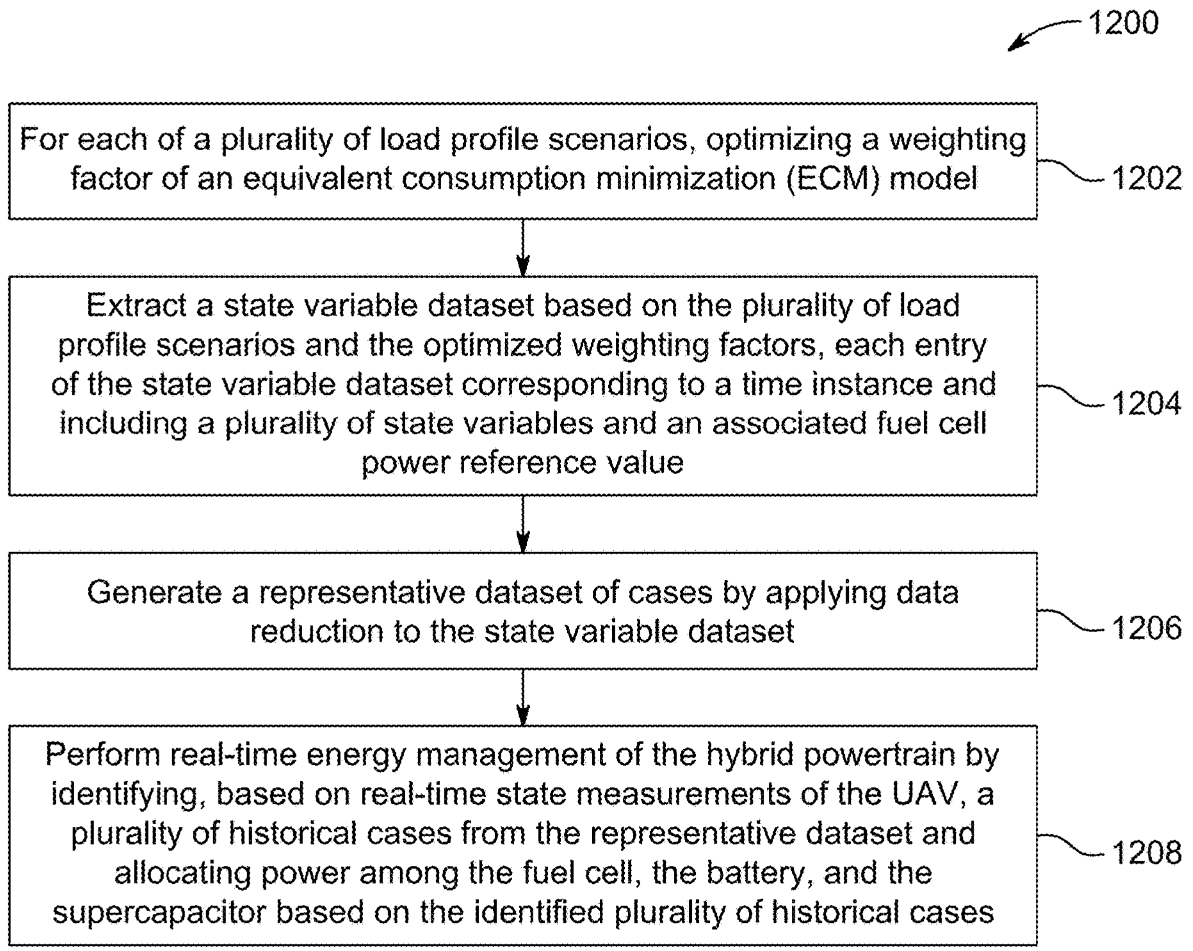
FIG. 12 is a flowchart of a method for managing energy in the UAV, according to certain embodiments.

FIG. 12 is a flowchart of a method 1200 for managing energy in the UAV 108, according to certain embodiments. The method 1200 may be implemented by the apparatus 100. The UAV 108, including a hybrid powertrain configured to provide electric power to onboard power-consuming units coupled to a DC bus, the hybrid powertrain comprising a fuel cell coupled to the DC bus through a boost converter, a battery coupled to the DC bus through a bidirectional converter, and a supercapacitor directly coupled to the DC bus.

At step 1202, method 1200 includes optimizing a weighting factor of an equivalent consumption minimization (ECM) model for each of a plurality of load profile scenarios. The plurality of load profile scenarios are generated by acquiring a load profile from an experiment conducted with respect to the UAV 108, adjusting the acquired load profile to obtain a scaled load profile, and applying payload modulation (PLM), fast-dynamics modulation (FDM), and slow-dynamics modulation (SDM) to the scaled load profile to synthesize the plurality of load profile scenarios. Each of the plurality of load profile scenarios is synthesized to simulate a corresponding degree of load fluctuations of the onboard power-consuming units.

In certain embodiments, the ECM model includes a first penalty function responsive to a state-of-charge (SOC) deviation of the battery and a second penalty function responsive to a power deviation of the fuel cell. The optimizing step includes, for each of the plurality of load profile scenarios, optimizing a first weighting factor corresponding to the first penalty function and a second weighting factor corresponding to the second penalty function, so as to minimize an equivalent power consumption of the UAV 108. The optimizing step further includes, for each of the plurality of load profile scenarios, identifying a pair of optimized first and second weighting factors based on a non-dominated sorting genetic algorithm (NSGA-II), so as to achieve a minimized hydrogen consumption and a minimized SOC deviation.

At step 1204, the method 1200 further includes extracting a state variable dataset based on the plurality of load profile scenarios and the optimized weighting factors. Each entry of the state variable dataset corresponds to a time instance and includes a plurality of state variables and an associated fuel cell power reference value. The plurality of state variables includes a state-of-charge (SOC) deviation of the battery, a filtered load power, a deviation between a load power and the filtered load power, a deviation between a fuel cell power and the filtered load power, and a deviation between a battery power and a reference charging power.

At step 1206, the method 1200 further includes generating a representative dataset of cases by applying data reduction to the state variable dataset. The generating step includes performing k-means clustering to partition the state variable dataset into a number of clusters, so as to identify the representative dataset. The representative dataset has a size substantially smaller than a size of the state variable dataset.

At step 1208, the method 1200 further includes performing real-time energy management of the hybrid powertrain by identifying, based on real-time state measurements of the UAV 108, a plurality of historical cases from the representative dataset and allocating power among the fuel cell, the battery, and the supercapacitor based on the identified plurality of historical cases.

In certain embodiments, the plurality of historical cases is identified based on a similarity metric representing a degree of similarity between each case in the representative dataset and a current case represented by the real-time state measurements of the UAV 108. The similarity metric is a weighted Euclidean distance calculated across the plurality of state variables. A k-nearest neighbors algorithm is applied to select a plurality of historical cases having smallest weighted Euclidean distances as the identified plurality of historical cases. Weights used in the weighted Euclidean distance represent relative importances of each of the plurality of state variables.

In certain embodiments, a weighted average estimation is applied, based on weights determined based on inverse of distances between the current case and each of the identified plurality of historical cases, to generate a real time power reference value of the fuel cell.

Accordingly, the method 1200 enables efficient real-time energy management in the UAV 108 by optimizing ECM model parameters, extracting representative datasets, and performing similarity-based case retrieval for power allocation among the fuel cell, the battery, and the supercapacitor.

Figure 13:
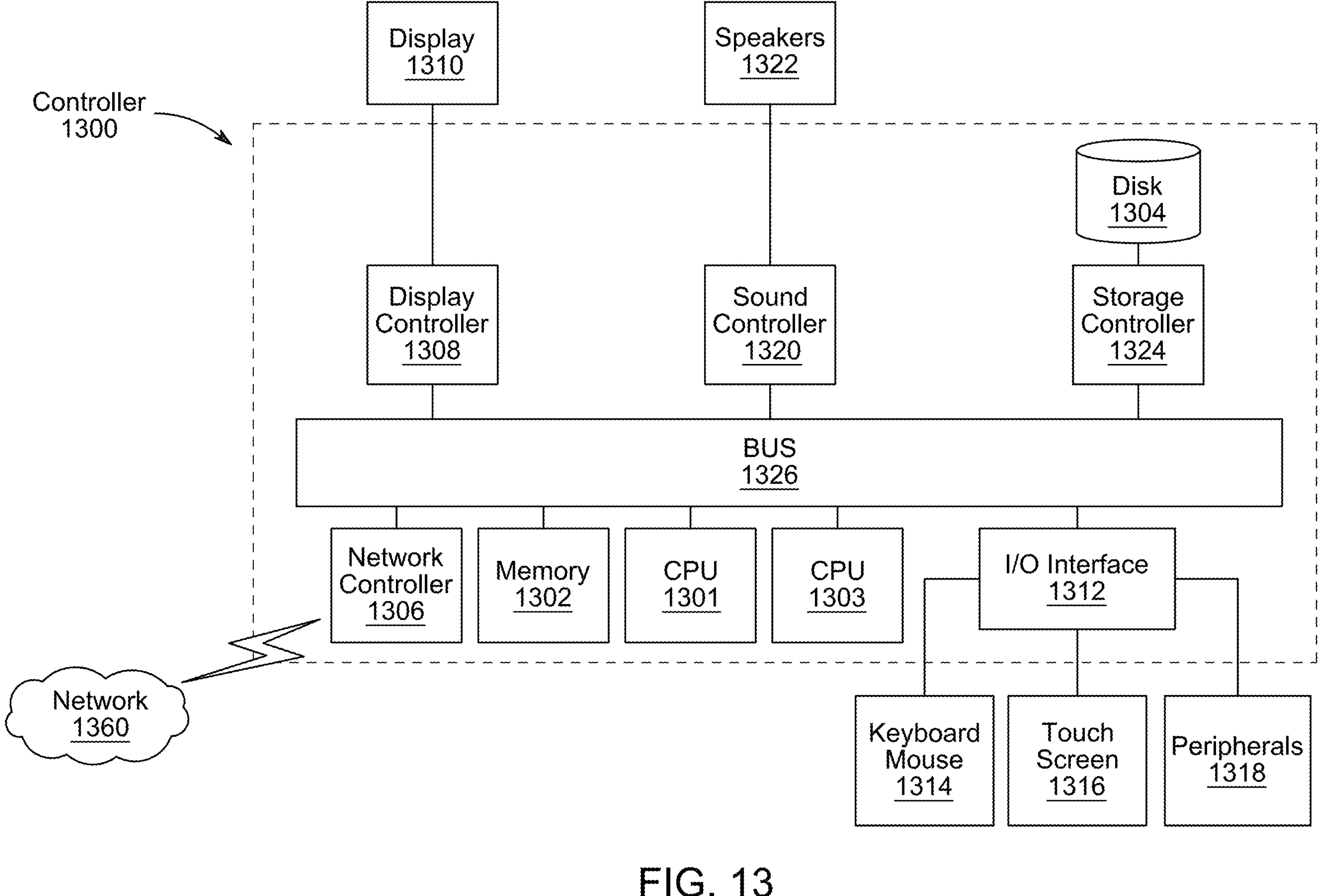
FIG. 13 is an illustration of a non-limiting example of details of computing hardware used in the computing system, according to certain embodiments.

Details of the hardware description of the computing environment according to exemplary embodiments is described with reference to FIG. 13. In FIG. 13, a controller 1300 is described as representative of the system in which the controller is a computing device which includes a CPU 1301 which performs the processes described above/below. The process data and instructions may be stored in memory 1302. These processes and instructions may also be stored on a storage medium disk 1304 such as a hard drive (HDD) or portable storage medium or may be stored remotely. Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 1301, 1303 and an operating system such as Microsoft Windows 7, Microsoft Windows 10, UNIX, LINUX, Apple MAC-OS and other systems known to those skilled in the art. The hardware elements in order to achieve the computing device may be realized by various circuitry elements, known to those skilled in the art. For example, CPU 1301 or CPU 1303 may be a Xenon or Core processor from Intel of America or an Opteron processor from AMD of America, or may be other processor types that would be recognized by one of ordinary skill in the art. Alternatively, the CPU 1301, 1303 may be implemented on an FPGA, ASIC, PLD or using discrete logic circuits, as one of ordinary skill in the art would recognize. Further, CPU 1301, 1303 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1360. As can be appreciated, the network 1360 can be a public network, such as the Internet, or a private network such as an LAN or WAN network, or any combination thereof and can also include PSTN or ISDN sub-networks. The network 1360 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 1308, such as a NVIDIA Geforce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard. A sound controller 1320 is also provided in the computing device such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 14.

Figure 14:
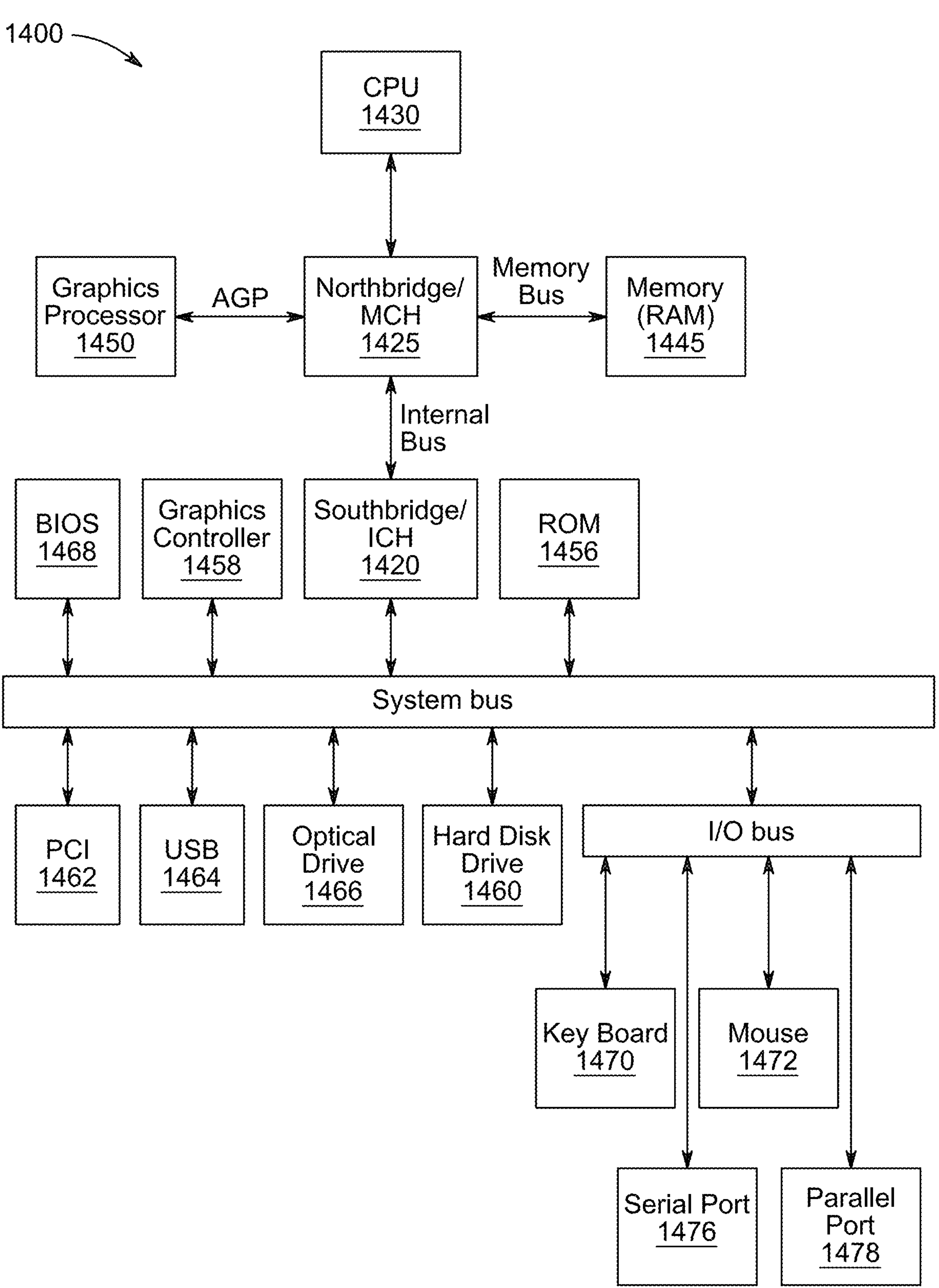
FIG. 14 is an exemplary schematic diagram of a data processing system used within the computing system, according to certain embodiments.

FIG. 14 shows a schematic diagram of a data processing system, according to certain embodiments, for performing the functions of the exemplary embodiments. The data processing system is an example of a computer in which code or instructions implementing the processes of the illustrative embodiments may be located. In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU processing unit 1430 may contain one or more processors and even may be implemented using one or more heterogeneous processor systems.

Figure 15:
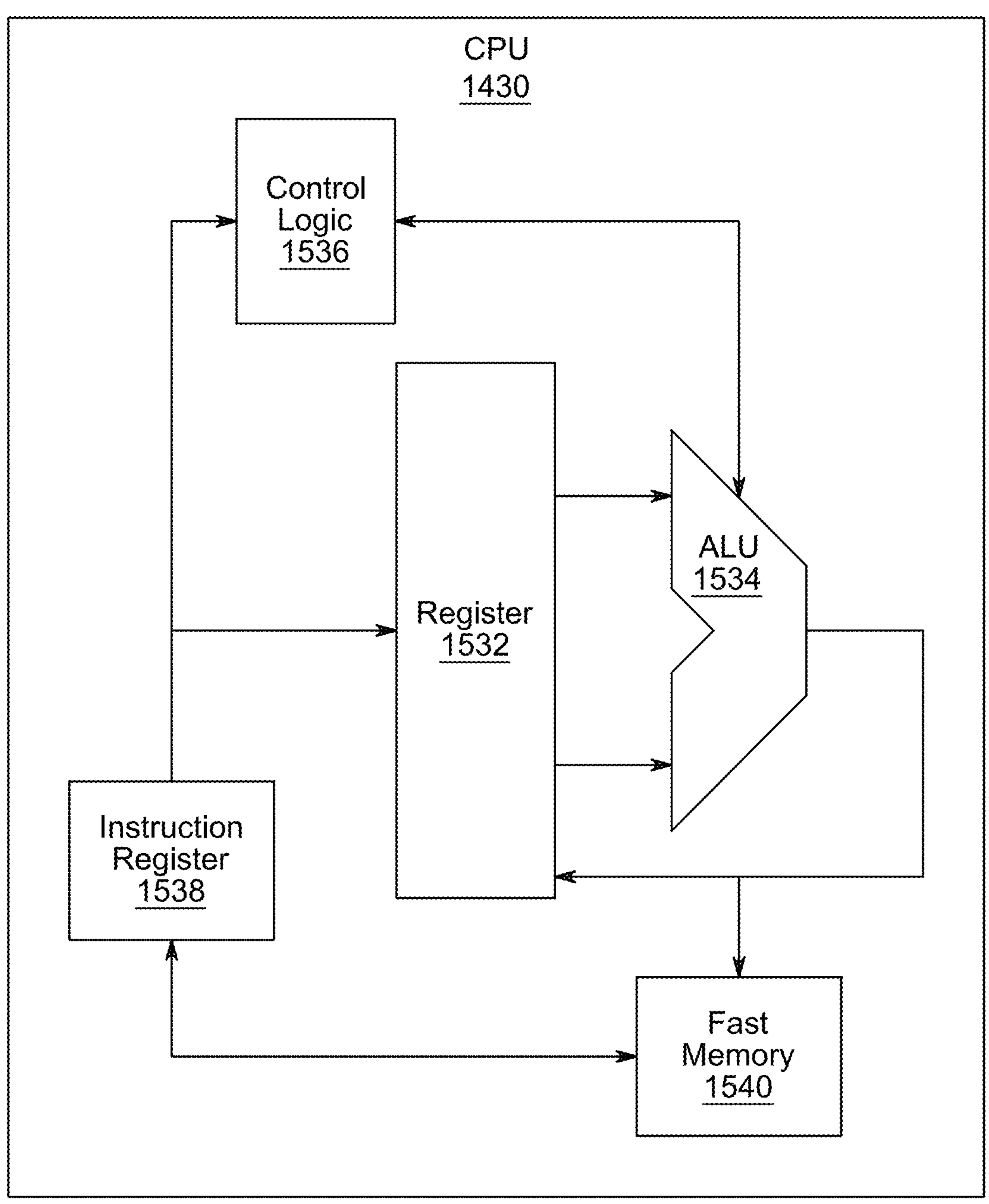
FIG. 15 is an exemplary schematic diagram of a processor used with the computing system, according to certain embodiments.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 1430. Part of the instructions can also be directed to the register 1532. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be fed back into the register and/or stored in the fast memory 1540.

According to certain implementations, the instruction set architecture of the CPU 1430 can use a reduced instruction set architecture, a complex instruction set architecture, a vector processor architecture, or a very large instruction word architecture. Furthermore, the CPU 1430 can be based on the Von Neumann model or the Harvard model. The CPU 1430 can be a digital signal processor, an FPGA, an ASIC, a PLA, a PLD, or a CPLD. Further, the CPU 1430 can be an x86 processor by Intel or by AMD; an ARM processor, a Power architecture processor by IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read-only memory (ROM) 1456, universal serial bus (USB) port 1464, a flash binary input/output system (BIOS) 1468, and a graphics controller 1458. PCI/PCIe devices can also be coupled to SB/ICH 1420 through a PCI bus 1462. The PCI devices may include, for example, Ethernet adapters, add-in cards, and PC cards for notebook computers. The hard disk drive (HDD) 1460 and CD-ROM 1466 can use, for example, an integrated drive electronics (IDE) or serial advanced technology attachment (SATA) interface. In one implementation, the I/O bus can include a super I/O (SIO) device. Further, the hard disk drive 1460 and optical drive 1466 can also be coupled to the SB/ICH 1420 through a system bus.

In one implementation, a keyboard 1470, a mouse 1472, a parallel port 1478, and a serial port 1476 can be connected to the system bus through the I/O bus. Other peripherals and devices that can be connected to the SB/ICH 1420 include a mass storage controller such as SATA or PATA, an Ethernet port, an ISA bus, a LPC bridge, SMBus, a DMA controller, and an Audio Codec. Moreover, the present disclosure is not limited to the specific circuit elements described herein, nor is it limited to the specific sizing and classification of these elements. For example, the skilled artisan will appreciate that the circuitry described herein may be adapted based on changes in battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smartphones, tablets, and personal digital assistants (PDAs)).

Figure 16:
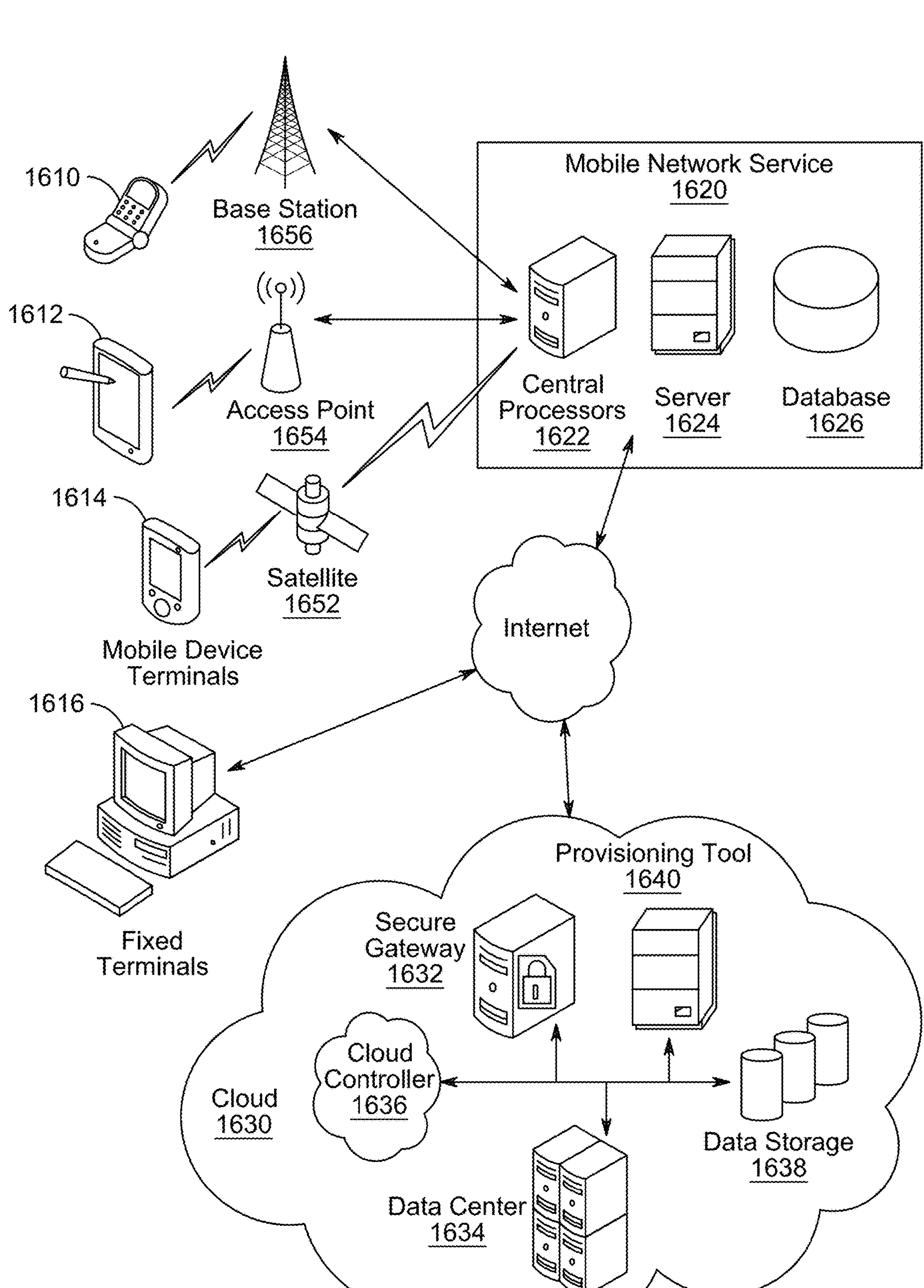
FIG. 16 is an illustration of a non-limiting example of distributed components which may share processing with the controller, according to certain embodiments.

More specifically, FIG. 16 illustrates client devices including a smartphone 1610, a tablet 1612, a mobile device terminal 1614, and fixed terminals 1616. These client devices may be communicatively coupled with a mobile network service 1620 via a base station 1656, an access point 1654, a satellite 1652, or via an internet connection. The mobile network service 1620 may comprise central processors 1622, a server 1624, and a database 1626. The fixed terminals 1616 and the mobile network service 1620 may be communicatively coupled via an internet connection to functions in cloud 1630 that may comprise a security gateway 1632, a data center 1634, a cloud controller 1636, a data storage 1638, and a provisioning tool 1640. The network may be a private network, such as a LAN or a WAN, or may be a public network, such as the Internet.

Input to the system may be received via direct user input or remotely either in real time or as a batch process. Additionally, some implementations may be performed on modules or hardware not identical to those described. Accordingly, other implementations are within the scope that may be disclosed. Accordingly, other implementations are within the scope that may be disclosed.

The present technology provides a system 100 and method 1200 for energy management in the UAV 108 equipped with a hybrid powertrain. The system 100 and method 1200 enable real-time allocation of power among a fuel cell, a battery, and a supercapacitor using a case-based reasoning (CBR)-based energy management framework. The present technology ensures optimal energy utilization by dynamically responding to varying load profiles, maintaining the state-of-charge (SOC) of the battery close to its reference value, and minimizing hydrogen consumption without compromising system endurance or efficiency.

The system 100 and method 1200 achieve a significant advancement by ensuring a smooth fuel cell power profile, thereby reducing transient load fluctuations that lead to fuel cell degradation. The smoother power transitions contribute to improved fuel cell health and extended service life while maintaining high operational stability. Additionally, the disclosed CBR-based framework effectively reduces computational demand compared to conventional equivalent consumption minimization (ECM) techniques by leveraging optimized historical case datasets and similarity-based reasoning for real-time decision-making.

Unlike existing optimized rule-based (ORB) and fuzzy logic (FL) energy management systems, which struggle to adapt to new and dynamic load scenarios, the disclosed system 100 and method 1200 exhibit enhanced adaptability and robust control accuracy across various flight profiles. The system dynamically adjusts power contributions from the fuel cell, battery, and supercapacitor to achieve balanced performance under both steady-state and transient load conditions.

The system 100 and method 1200 further demonstrate superior overall efficiency and extended mission endurance, achieving endurance values between 66.7 and 71.9 minutes and efficiency levels up to 82.9%, thereby enhancing flight sustainability and reducing operational costs. The disclosed system 100 and method 1200 thus provide substantial improvements over existing energy management approaches such as ORB, FL, and ECM by combining data-driven adaptability, low computational complexity, enhanced energy efficiency, and improved component longevity. These advancements establish the present technology as a robust, scalable, and computationally efficient solution for real-time hybrid UAV power management in dynamic and unpredictable flight environments The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for managing energy in an unmanned aerial vehicle (UAV), the UAV including a hybrid powertrain configured to provide electric power to onboard power-consuming units coupled to a DC bus, the hybrid powertrain comprising a fuel cell coupled to the DC bus through a boost converter, a battery coupled to the DC bus through a bidirectional converter, and a supercapacitor directly coupled to the DC bus, the method comprising:

for each of a plurality of load profile scenarios, optimizing a weighting factor of an equivalent consumption minimization (ECM) model;

extracting a state variable dataset based on the plurality of load profile scenarios and the optimized weighting factors, each entry of the state variable dataset corresponding to a time instance and including a plurality of state variables and an associated fuel cell power reference value;

generating a representative dataset of cases by applying data reduction to the state variable dataset; and performing real-time energy management of the hybrid powertrain by identifying, based on real-time state measurements of the UAV, a plurality of historical cases from the representative dataset and allocating power among the fuel cell, the battery, and the supercapacitor based on the identified plurality of historical cases.

2. The method of claim 1, wherein the plurality of load profile scenarios are generated by:

acquiring a load profile from an experiment conducted with respect to the UAV, adjusting the acquired load profile to obtain a scaled load profile, and applying payload modulation (PLM), fast-dynamics modulation (FDM), and slow-dynamics modulation (SDM) to the scaled load profile to synthesize the plurality of load profile scenarios.

3. The method of claim 2, wherein each of the plurality of load profile scenarios is synthesized to simulate a corresponding degree of load fluctuations of the onboard power-consuming units.

4. The method of claim 1, wherein the ECM model includes a first penalty function responsive to a state-of-charge (SOC) deviation of the battery and a second penalty function responsive to a power deviation of the fuel cell, and the optimizing step further comprises, for each of the plurality of load profile scenarios, optimizing a first weighting factor corresponding to the first penalty function and a second weighting factor corresponding to the second penalty function, so as to minimize an equivalent power consumption of the UAV.

5. The method of claim 4, wherein the optimizing step further comprises, for each of the plurality of load profile scenarios, identifying a pair of optimized first and second weighting factors based on a non-dominated sorting genetic algorithm, so as to achieve a minimized hydrogen consumption and a minimized SOC deviation.

6. The method of claim 1, wherein the plurality of state variables includes:

a state-of-charge (SOC) deviation of the battery, a filtered load power, a deviation between a load power and the filtered load power, a deviation between a fuel cell power and the filtered load power, and a deviation between a battery power and a reference charging power.

7. The method of claim 1, wherein the generating step further comprises performing k-means clustering to partition the state variable dataset into a number of clusters, so as to identify the representative dataset, the representative dataset having a size substantially smaller than a size of the state variable dataset.

8. The method of claim 1, wherein the plurality of historical cases are identified based on a similarity metric representing a degree of similarity between each case in the representative dataset and a current case represented by the real-time state measurements of the UAV.

9. The method of claim 8, wherein the similarity metric is a weighted Euclidean distance calculated across the plurality of state variables, a k-nearest neighbors algorithm is applied to select a plurality of historical cases having smallest weighted Euclidean distances, as the identified plurality of historical cases, and weights used in the weighted Euclidean distance represents relative importances of each of the plurality of state variables.

10. The method of claim 8, wherein a weighted average estimation is applied, based on weights determined based on inverse of distances between the current case and each of the identified plurality of historical cases, to generate a real time power reference value of the fuel cell.

11. An apparatus for managing energy in an unmanned aerial vehicle (UAV), the UAV including a hybrid powertrain configured to provide electric power to onboard power-consuming units coupled to a DC bus, the hybrid powertrain comprising a fuel cell coupled to the DC bus through a boost converter, a battery coupled to the DC bus through a bidirectional converter, and a supercapacitor directly coupled to the DC bus, the apparatus comprising:

processing circuitry configured to for each of a plurality of load profile scenarios, optimize a weighting factor of an equivalent consumption minimization (ECM) model, extract a state variable dataset based on the plurality of load profile scenarios and the optimized weighting factors, each entry of the state variable dataset corresponding to a time instance and including a plurality of state variables and an associated fuel cell power reference value, generate a representative dataset of cases by applying data reduction to the state variable dataset, and perform real-time energy management of the hybrid powertrain by identifying, based on real-time state measurements of the UAV, a plurality of historical cases from the representative dataset and allocating power among the fuel cell, the battery, and the supercapacitor based on the identified plurality of historical cases.

12. The apparatus of claim 11, wherein the plurality of load profile scenarios are generated by:

acquiring a load profile from an experiment conducted with respect to the UAV, adjusting the acquired load profile to obtain a scaled load profile, and applying payload modulation (PLM), fast-dynamics modulation (FDM), and slow-dynamics modulation (SDM) to the scaled load profile to synthesize the plurality of load profile scenarios.

13. The apparatus of claim 12, wherein each of the plurality of load profile scenarios is synthesized to simulate a corresponding degree of load fluctuations of the onboard power-consuming units.

14. The apparatus of claim 11, wherein the ECM model includes a first penalty function responsive to a state-of-charge (SOC) deviation of the battery and a second penalty function responsive to a power deviation of the fuel cell, and the processing circuitry is further configured to, for each of the plurality of load profile scenarios, optimize a first weighting factor corresponding to the first penalty function and a second weighting factor corresponding to the second penalty function, so as to minimize an equivalent power consumption of the UAV.

15. The apparatus of claim 14, wherein the processing circuitry is further configured to, for each of the plurality of load profile scenarios, identify a pair of optimized first and second weighting factors based on a non-dominated sorting genetic algorithm, so as to achieve a minimized hydrogen consumption and a minimized SOC deviation.

16. The apparatus of claim 11, wherein the plurality of state variables includes:

a state-of-charge (SOC) deviation of the battery, a filtered load power, a deviation between a load power and the filtered load power, a deviation between a fuel cell power and the filtered load power, and a deviation between a battery power and a reference charging power.

17. The apparatus of claim 11, wherein the processing circuitry is further configured to perform k-means clustering to partition the state variable dataset into a number of clusters, so as to identify the representative dataset, the representative dataset having a size substantially smaller than a size of the state variable dataset.

18. The apparatus of claim 11, wherein the plurality of historical cases are identified based on a similarity metric representing a degree of similarity between each case in the representative dataset and a current case represented by the real-time state measurements of the UAV.

19. The apparatus of claim 18, wherein the similarity metric is a weighted Euclidean distance calculated across the plurality of state variables, a k-nearest neighbors algorithm is applied to select a plurality of historical cases having smallest weighted Euclidean distances, as the identified plurality of historical cases, and weights used in the weighted Euclidean distance represents relative importances of each of the plurality of state variables.

20. The apparatus of claim 18, wherein a weighted average estimation is applied, based on weights determined based on inverse of distances between the current case and each of the identified plurality of historical cases, to generate a real time power reference value of the fuel cell.

* * * * *